US012749713B2

(12) United States Patent
Xiang et al.

(10) Patent No.: US 12,749,713 B2
(45) Date of Patent: Sep. 29, 2026

(54) NON-AQUEOUS ELECTROLYTE AND BATTERY

(71) Applicant: SHENZHEN CAPCHEM TECHNOLOGY CO., LTD., Shenzhen (CN)

(72) Inventors: Shuhuai Xiang, Shenzhen (CN); Yang Yi, Shenzhen (CN); Shiguang Hu, Shenzhen (CN); Yong Zhang, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 479 days.

(21) Appl. No.: 18/577,680

(22) PCT Filed: Jun. 21, 2022

(86) PCT No.: PCT/CN2022/100180

§ 371 (c)(1),
(2) Date: Jan. 8, 2024

(87) PCT Pub. No.: WO2023/279953

PCT Pub. Date: Jan. 12, 2023

(65) Prior Publication Data

US 2024/0322242 A1 Sep. 26, 2024

(30) Foreign Application Priority Data

Jul. 9, 2021 (CN) ......................... 202110780742.0

(51) Int. Cl.

| | |
|---|---|
| ***H01M 10/0567*** | (2010.01) |
| ***C07F 5/04*** | (2006.01) |
| ***H01M 10/052*** | (2010.01) |
| ***H01M 10/0525*** | (2010.01) |
| ***H01M 10/0568*** | (2010.01) |
| ***H01M 10/0569*** | (2010.01) |
| ***H01M 10/42*** | (2006.01) |

(52) U.S. Cl.

CPC ........... *H01M 10/0567* (2013.01); *C07F 5/04* (2013.01); *H01M 10/0525* (2013.01); *H01M 10/0568* (2013.01); *H01M 10/0569* (2013.01); *H01M 10/4235* (2013.01); *H01M 2300/004* (2013.01)

(58) Field of Classification Search

CPC ......... H01M 10/0567; H01M 10/0525; H01M 10/0568; H01M 10/0569; H01M 10/4235; H01M 2300/004; C07F 5/04

See application file for complete search history.

(56) References Cited

U.S. PATENT DOCUMENTS

2019/0245244 A1* 8/2019 Lim .................. H01M 10/0569

FOREIGN PATENT DOCUMENTS

| | | | | | |
|---|---|---|---|---|---|
| CN | 103183698 | A | | 7/2013 | |
| CN | 105047995 | A | | 11/2015 | |
| CN | 109786837 | A | | 5/2019 | |
| CN | 110911748 | A | | 3/2020 | |
| CN | 117352836 | A | * | 1/2024 | ........ H01M 10/0567 |
| JP | 2015125907 | A | | 7/2015 | |
| JP | 2021022525 | A | * | 2/2021 | |
| KR | 20160032456 | A | | 3/2016 | |
| KR | 20210157176 | A | * | 12/2021 | .......... H01M 10/052 |

OTHER PUBLICATIONS

Extended European Search Report of Counterpart European Patent Application No. 22836707.4 issued on May 27, 2025.

International search report of PCT Patent Application No. PCT/CN2022/100180 issued on Sep. 15, 2022.

* cited by examiner

*Primary Examiner* — Haidung D Nguyen

(57) ABSTRACT

Provided is a non-aqueous electrolyte, comprising a solvent, an electrolyte salt and a compound represented by structural formula 1:

Structural formula 1

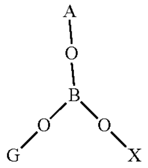

wherein, A, G and X are each independently selected from a cyclic sulfate group and its derivatives, a cyclic sulfonate group and its derivatives, a cyclic sulfite group and its derivatives or a group D; one or none of A, G and X is selected from the group D, and the group D is selected from a C1-C4 alkyl group, a C1-C4 unsaturated hydrocarbon group, a C1-C4 haloalkyl group, a C1-C4 nitrile group, a C1-C4 ether group or a C1-C4 ketone group. The application also provides a battery comprising the non-aqueous electrolyte. By adopting the above compound as an additive for the non-aqueous electrolyte, the film-forming quality of the surfaces of positive and negative electrodes can be effectively improved, and thus the battery performance is improved.

12 Claims, No Drawings

NON-AQUEOUS ELECTROLYTE AND BATTERY

TECHNICAL FIELD

The application belongs to the technical field of secondary batteries, and particularly relates to a non-aqueous electrolyte and a battery.

BACKGROUND

During the charging and discharging process of lithium ion battery, chemical or electrochemical reaction occurs on the electrode surface, and the reaction deposits form a thin film, which is called SEI film at the negative electrode and CEI film at the positive electrode. In graphite negative electrode, SEI film is formed by organic and inorganic decomposition products deposited on graphite surface during the reduction process of solvent and solute in electrolyte. This film can keep the dynamic stability of electrolyte in the future charging and discharging process, so that the solvent and solute in the electrolyte would not continue to decompose. Meanwhile, the SEI film can prevent solvent from embedding into graphite layer to cause separation and decomposition, thus improving battery performance. However, the SEI film will be partially lost in the process of charging and discharging, so an effective and stable SEI film has a vital impact on the battery life and cycle performance, especially in the process of high rate and deep discharge. The lithium ion conductivity of SEI film also has a significant influence on the rate performance of battery. High ion conductivity can improve the rate performance and reduce the battery impedance. In addition, the SEI film is very sensitive to temperature, so the battery performances at high and low temperatures are also closely related to the SEI film. More importantly, the SEI film also determines the safety performance of battery. The CEI film is similar to SEI film, their composition is very complex. The thickness, composition, pattern and compactness have a significant impact on battery performance.

At present, the SEI film formed by additives can improve the battery performance to some extent, but it still has some shortcomings such as uneven film thickness on surface and poor high-temperature stability, which have adverse effects on battery life and high-rate discharge. How to develop an additive that can further improve the quality of SEI film is an urgent problem to be solved.

SUMMARY

Aiming at the problem that the SEI film of the existing lithium ion battery has poor high-temperature stability, the application provides a non-aqueous electrolyte and a battery.

The technical solution adopted by the application to solve the technical problem is as follows.

In one aspect, the application provides a non-aqueous electrolyte, including a solvent, an electrolyte salt and a compound represented by structural formula 1:

Structural formula 1

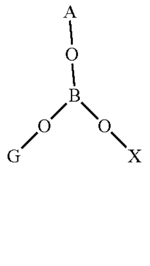

wherein, A, G and X are each independently selected from a cyclic sulfate group and its derivatives, a cyclic sulfonate group and its derivatives, a cyclic sulfite group and its derivatives or a group D; one or none of A, G and X is selected from the group D, and the group D is selected from a C1-C4 alkyl group, a C1-C4 unsaturated hydrocarbon group, a C1-C4 haloalkyl group, a C1-C4 nitrile group, a C1-C4 ether group or a C1-C4 ketone group.

Optionally, the cyclic sulfate group and its derivatives are selected from a group represented by structural formula 2:

Structural formula 2

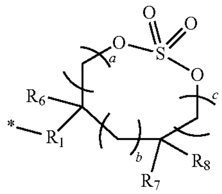

wherein * is a bonding position, $R_1$ is selected from a single bond, a C1-C4 alkylene group and an alkylene group in which at least one hydrogen atom is substituted by a heteroatom-containing group, a, b and c are natural numbers, and a sum of a, b and c is any natural number from 0 to 5; $R_6$, $R_7$ and $R_8$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

Optionally, the cyclic sulfonate group and its derivatives are selected from a group represented by structural formula 3:

Structural formula 3

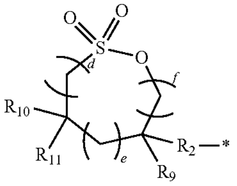

wherein * is a bonding position, $R_2$ is selected from a single bond, a C1-C4 alkylene group, and an alkylene group in which at least one hydrogen atom is substituted by a heteroatom-containing group, e, d and f are natural numbers, and a sum of d, e and f is any natural number from 0 to 5; $R_9$, $R_{10}$ and $R_{11}$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

Optionally, the cyclic sulfite group and its derivatives are selected from a group represented by structural formula 4:

Structural formula 4

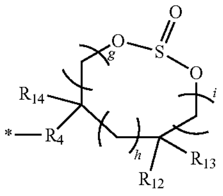

wherein * is a bonding position, $R_4$ is selected from a single bond, a C1-C4 alkylene group and an alkylene group in which at least one hydrogen atom is substituted by a heteroatom-containing group, g, h and i are natural numbers, and a sum of g, h and i is any natural number from 0 to 5; $R_{12}$, $R_{13}$ and $R_{14}$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

Optionally, the compound represented by structural formula 1 is selected from one or more of the following compounds:

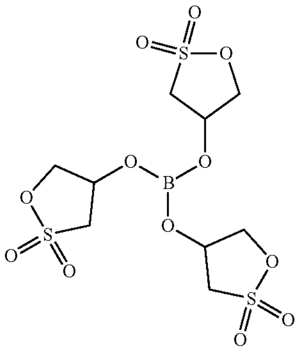

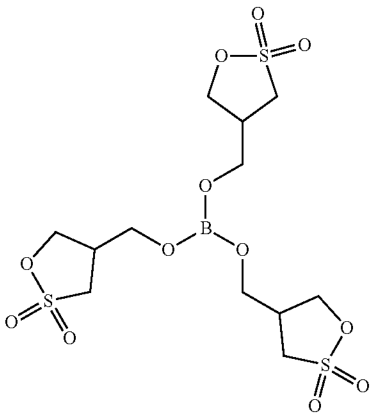

-continued

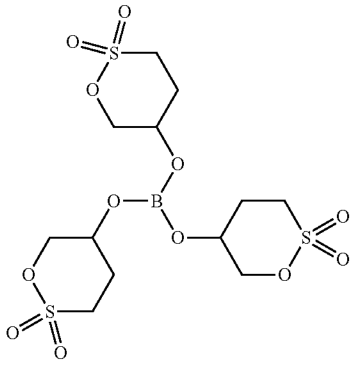

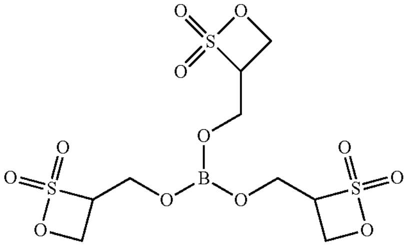

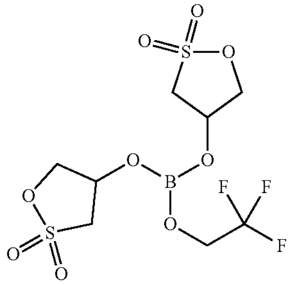

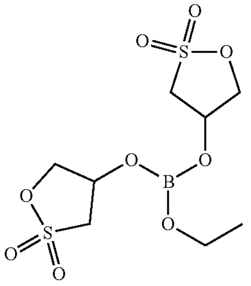

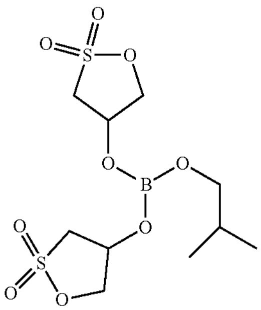

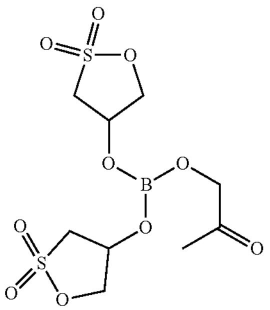

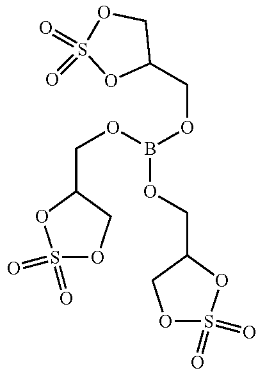

-continued
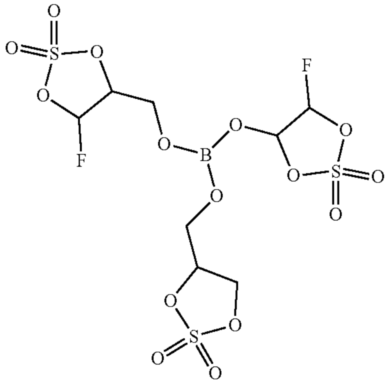
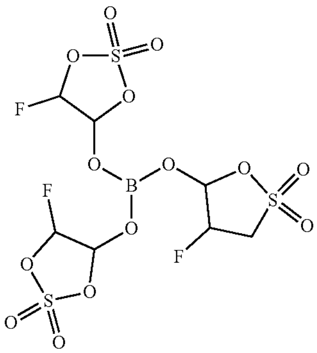
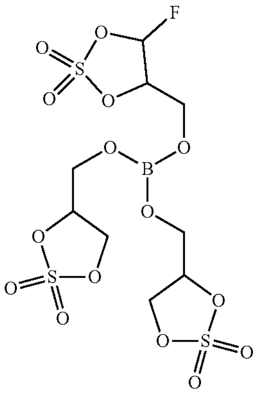
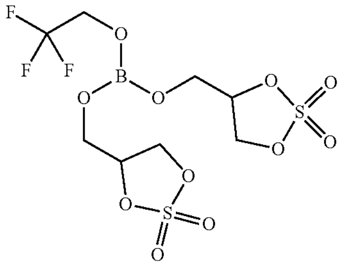
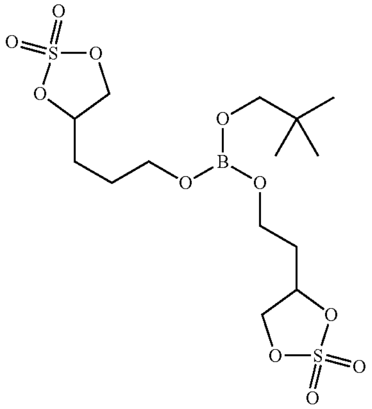
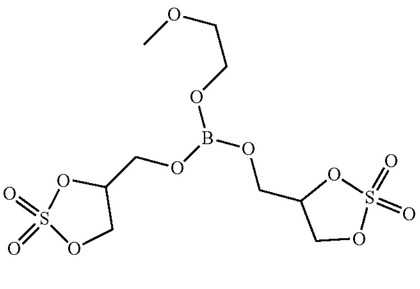
-continued
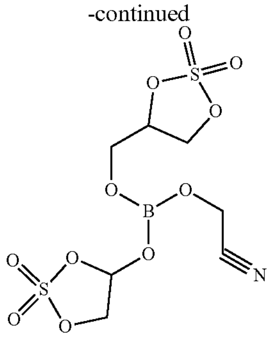
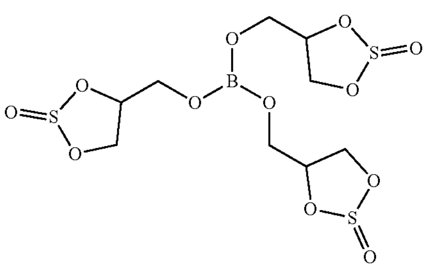
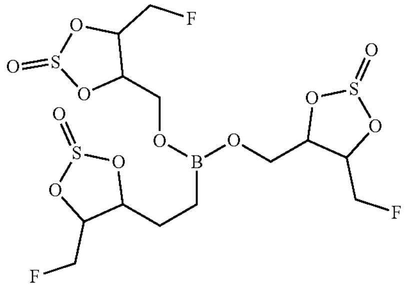
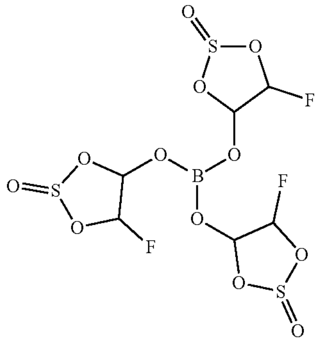
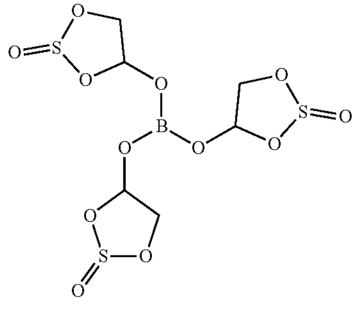

-continued
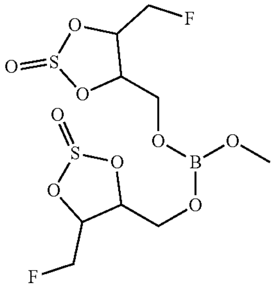
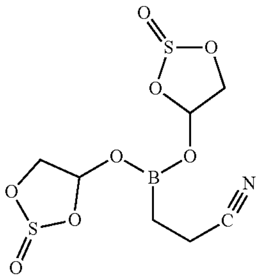
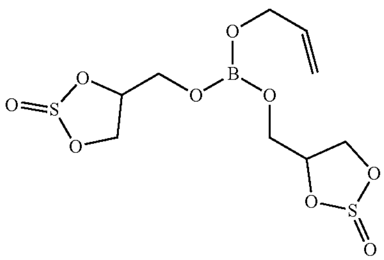
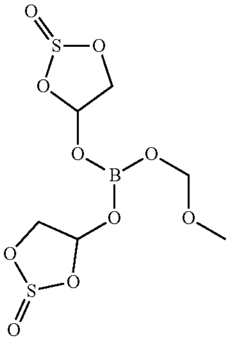
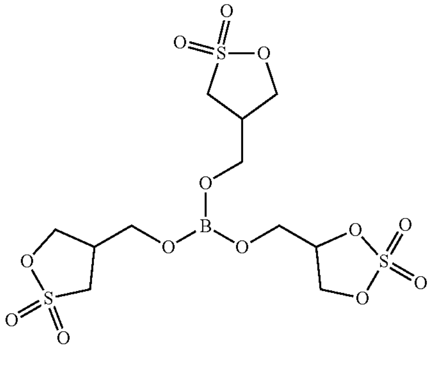
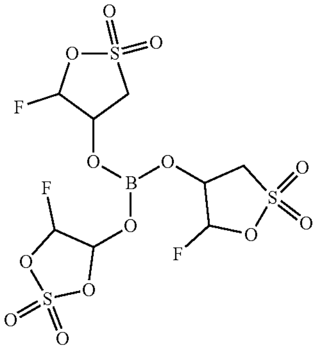
-continued
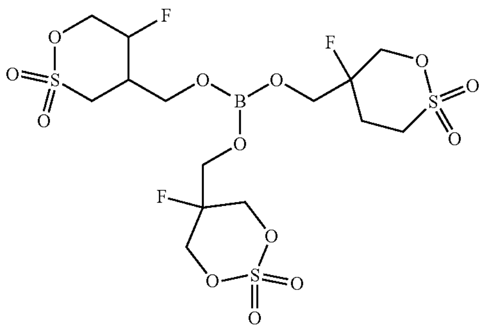
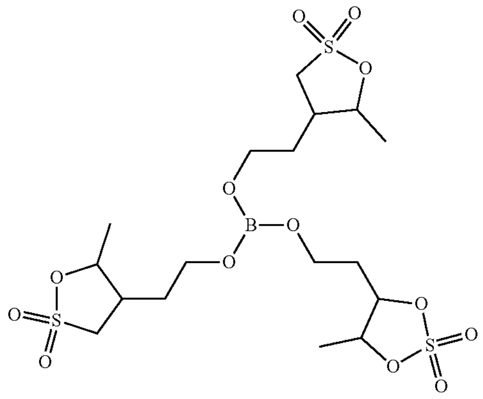
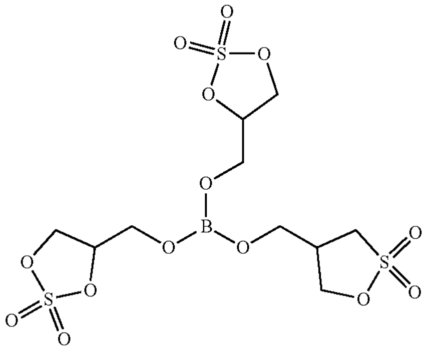
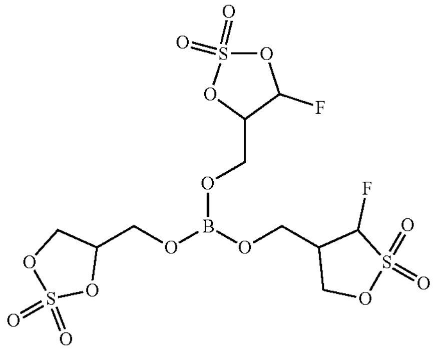

-continued
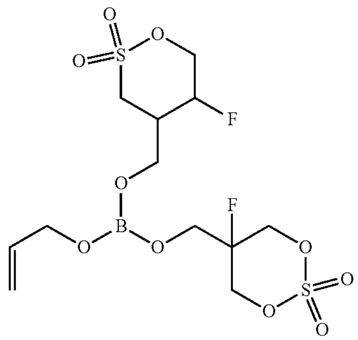
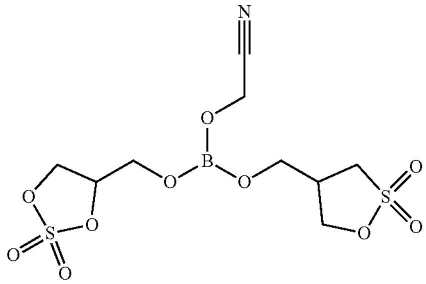
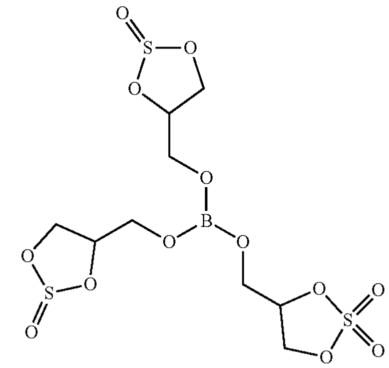
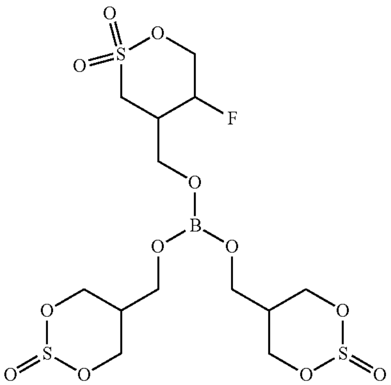
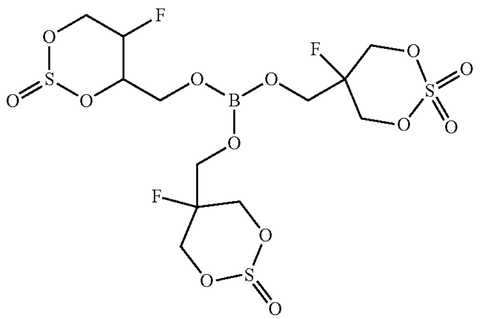
-continued
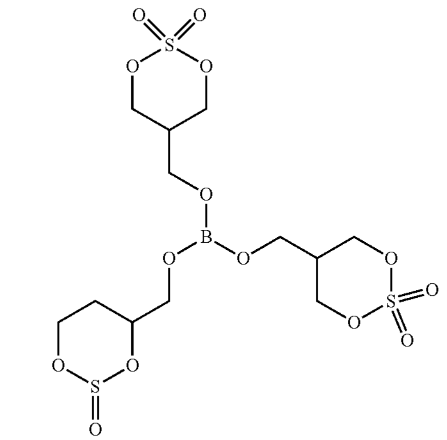
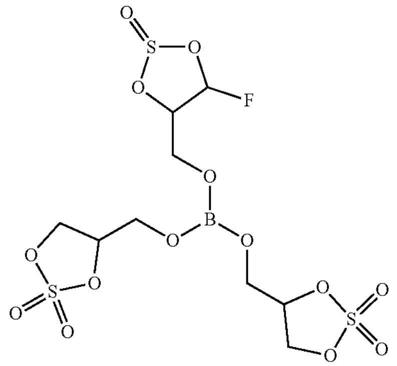
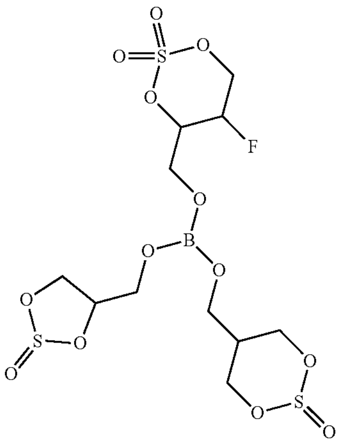
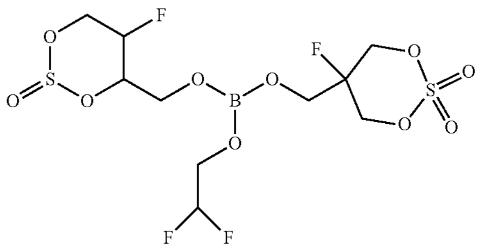

-continued
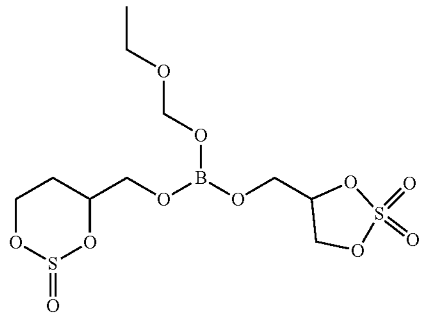
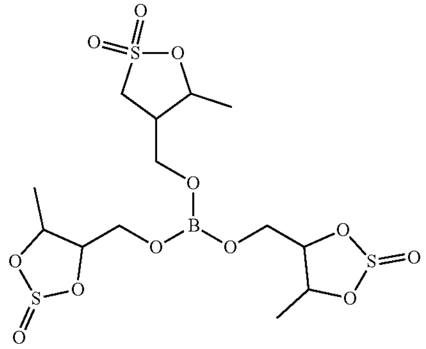
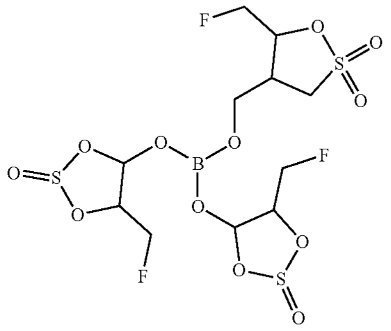
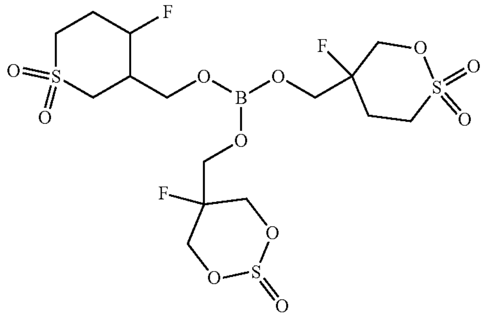
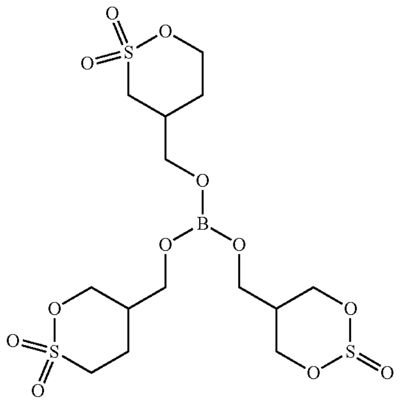
-continued
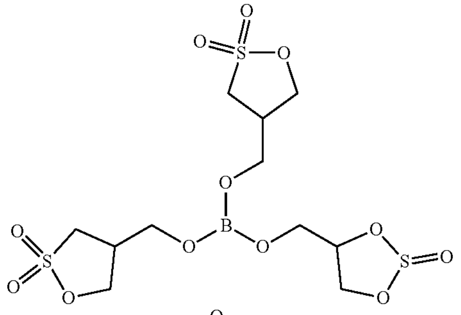
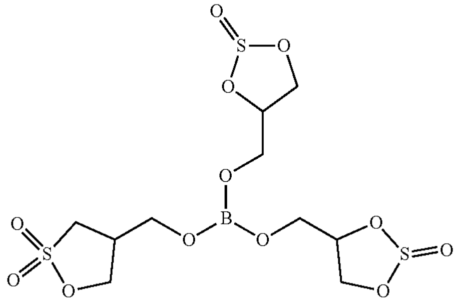
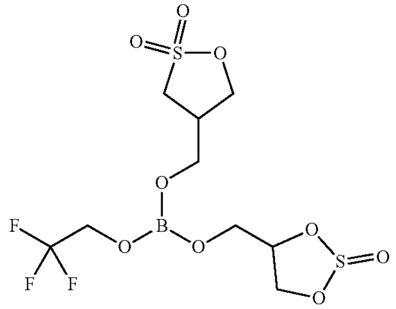
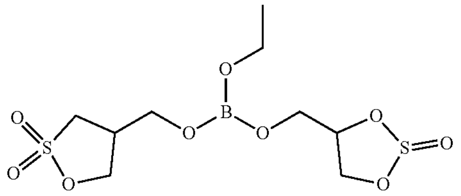
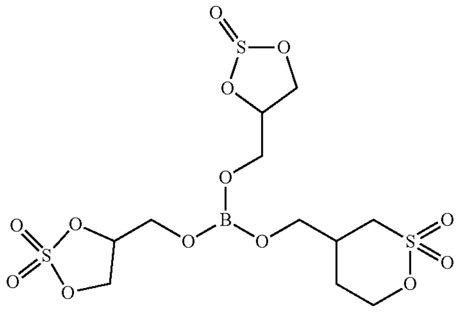
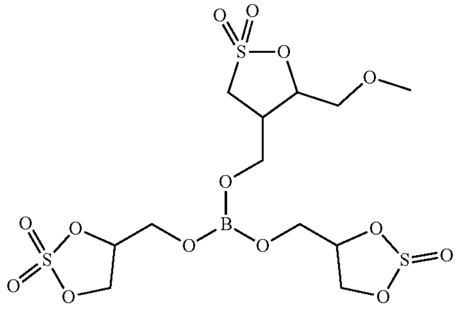

-continued

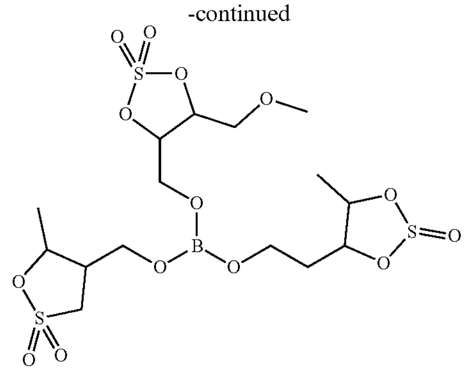

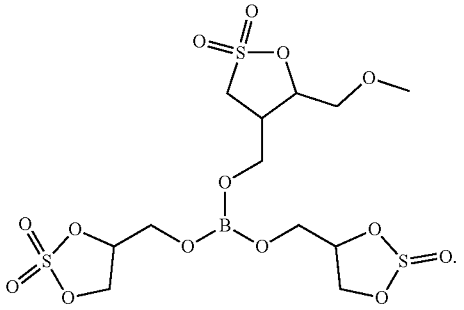

Optionally, an addition amount of the compound represented by structural formula 1 is 0.001-10% based on the total mass of the non-aqueous electrolyte being 100%.

Optionally, an addition amount of the compound represented by structural formula 1 is 0.1-3% based on the total mass of the non-aqueous electrolyte being 100%.

Optionally, the electrolyte salt is selected from at least one of $LiPF_6$, LiBOB, LiDFOB, $LiPO_2F_2$, $LiBF_4$, $LiSbF_6$, $LiAsF_6$, $LiN(SO_2CF_3)_2$, $LiN(SO_2C_2F_5)_2$, $LiC(SO_2CF_3)_3$, $LiN(SO_2F)_2$ and LiBETI.

Optionally, the non-aqueous electrolyte further includes a functional additive, and the functional additive includes at least one of a cyclic sulfate compound, a sultone compound, a carbonate compound or an unsaturated phosphate ester compound and a nitrile compound.

Optionally, the cyclic sulfate compound includes ethylene sulfate;

the sultone compound is selected from at least one of 1,3-propane sultone, 1,4-butane sultone and 1,3-propene sultone;

the cyclic carbonate compound is selected from at least one of vinylene carbonate, vinylethylene carbonate, fluoroethylene carbonate or a compound represented by structural formula 5, Structural formula 5

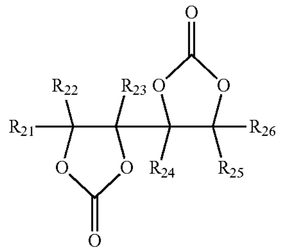

in structural formula 5, $R_{21}$, $R_{22}$, $R_{23}$, $R_{24}$, $R_{25}$ and $R_{26}$ are each independently selected from one of a hydrogen atom, a halogen atom and a C1-C5 group;

the unsaturated phosphate ester compound is selected from at least one compound represented by structural formula 6:

Structural formula 6

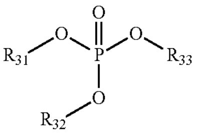

in structural formula 6, $R_{31}$, $R_{32}$ and $R_{32}$ are each independently selected from a C1-C5 saturated hydrocarbon group, a C1-C5 unsaturated hydrocarbon group, a C1-C5 halogenated hydrocarbon group and —$Si(C_mH_{2m+1})_3$, m is a natural number of 1-3, and at least one of $R_{31}$, $R_{32}$ and $R_{32}$ is an unsaturated hydrocarbon group.

The nitrile compound includes one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

The solvent includes one or more of ethylene carbonate, propene carbonate, butylene carbonate, dimethyl carbonate, diethyl carbonate, ethyl methyl carbonate and methyl propyl carbonate.

In one aspect, the application provides a battery, including a positive electrode, a negative electrode and the above-described non-aqueous electrolyte.

According to the non-aqueous electrolyte provided by the application, the compound represented by structural formula 1 is used as an additive. With a small addition amount, the film formation of the non-aqueous electrolyte on positive electrode and negative electrode can be greatly improved. The passive film formed by the compound represented by structural formula 1 has the advantages of high lithium ion conductivity and stability, thus improving the performance stability of the positive electrode and negative electrode materials in the long-term cycle and prolonging the cycle life of battery. Meanwhile, it is worth noting that, compared with some existing conventional additives, the high-temperature stability of the passivation film of the present application is particularly excellent. Therefore, the battery adopting the non-aqueous electrolyte provided by the application is particularly suitable for working at high temperature, thus the environmental adaptability of battery is improved.

DETAILED DESCRIPTION OF PREFERRED EMBODIMENTS

In order to make the to-be-solved technical problems, technical solutions and beneficial effects of the present application clearer, the present application will be described in further detail below with reference to embodiments. It should be understood that the specific embodiments described here are only used to illustrate the application, not intended to limit the application.

The embodiments of the application provide a non-aqueous electrolyte, which includes a solvent, an electrolyte salt and a compound represented by structural formula 1:

Structural formula 1

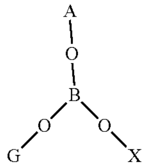

wherein, A, G and X are each independently selected from a cyclic sulfate group and its derivatives, a cyclic sulfonate group and its derivatives, a cyclic sulfite group and its derivatives or a group D; one or none of A, G and X is selected from the group D, and the group D is selected from a C1-C4 alkyl group, a C1-C4 unsaturated hydrocarbon group, a C1-C4 haloalkyl group, a C1-C4 nitrile group, a C1-C4 ether group or a C1-C4 ketone group.

The compound represented by structural formula 1 is used as an additive. With a small addition amount, the film formation of the non-aqueous electrolyte on positive electrode and negative electrode can be greatly improved. The passive film formed by the compound represented by structural formula 1 has the advantages of high lithium ion conductivity and stability, thus improving the performance stability of the positive electrode and negative electrode materials in the long-term cycle and prolonging the cycle life of battery. Meanwhile, it is worth noting that, compared with some existing conventional additives, the high-temperature stability of the passivation film of the present application is particularly excellent. Therefore, the battery adopting the non-aqueous electrolyte provided by the application is particularly suitable for working at high temperature, thus the environmental adaptability of battery is improved.

Because the film-forming mechanism on the positive electrode and negative electrode is complicated, the mechanism of improving the performance of the passivation film by the compound represented by structural formula 1 is not very clear. However, it can be understood that the central atom of the application is a boron atom, which is an electron-deficient center and has an empty orbit, and can interact with anions (e.g., fluoride ions) of inorganic lithium salt on SEI or CEI films, thereby reducing the electrostatic effect of anions on lithium ions, improving the lithium ion conductivity, and reducing the overall impedance of SEI film or CEI film, and thus improving the high-rate discharge efficiency. Moreover, the overall structure of the compound represented by structural formula 1 is a cross-linked structure, which has strong integrity after film formation, and is beneficial to reducing solubility of the SEI film in electrolyte, enhancing high-temperature stability, and improving battery life and cycle performance.

Examples of the alkyl group may be methyl, ethyl, propyl, isopropyl, butyl and isobutyl group.

Examples of the unsaturated hydrocarbon group may be ethenyl, propenyl, butenyl, ethynyl, propynyl and butynyl group.

As an example of the haloalkyl group, at least one hydrogen atom in the alkyl group is substituted by a halogen atom, and the halogen atom is selected from F, Cl, Br and I.

Examples of the nitrile group may be carbonitrile, acetonitrile, propionitrile and butyronitrile group.

As an example of the ether group, at least two adjacent carbon atoms in the alkyl group are connected by an oxygen atom.

As an example of the ketone group, at least one carbon atom in the alkyl group is connected with an oxygen double bond.

In some embodiments, the cyclic sulfate group and their derivatives are selected from the group represented by structural formula 2:

Structural formula 2

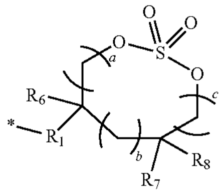

wherein * is a bonding position, $R_1$ is selected from a single bond, a C1-C4 alkylene group and an alkylene group in which at least one hydrogen atom is substituted by a heteroatom-containing group, a, b and c are natural numbers, and a sum of a, b and c is any natural number from 0 to 5; $R_6$, $R_7$ and $R_8$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

In the description of the present application, examples containing the heteroatom-containing group may be a nitrogen-containing group such as amino, hydrazine, nitro, cyano, isocyano and amidine group; an oxygen-containing group such as alkanoyl, carboxyl, alkoxycarbonyl, hydroxyl and alkoxy group; a sulfur-containing group such as sulfo, sulfenyl, alkylsulfenyl, alkylsulfonyl, alkylsulfonylamino, alkylaminosulfonyl, alkylsulfinyl, alkylaminosulfonyl, alkylsulfonylamino, and thiocarboxyl; and a halogen-containing group such as fluorine atom, chlorine atom, bromine atom and iodine atom.

In some embodiments, the cyclic sulfonate group and its derivatives are selected from the group represented by structural formula 3:

Structural formula 3

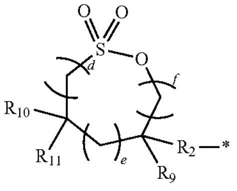

wherein * is a bonding position, $R_2$ is selected from a single bond, a C1-C4 alkylene group, and an alkylene group in which at least one hydrogen atom is substituted by a heteroatom-containing group, e, d and f are natural numbers, and a sum of d, e and f is any natural number from 0 to 5; $R_9$, $R_{10}$ and $R_{11}$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

In some embodiments, the cyclic sulfite group and its derivatives are selected from the group represented by structural formula 4:

Structural formula 4

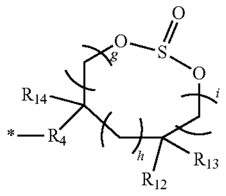

wherein * is a bonding position, $R_4$ is selected from a single bond, a C1-C4 alkylene group and an alkylene group in which at least one hydrogen atom is substituted by a heteroatom-containing group, g, h and i are natural numbers, and a sum of g, h and i is any natural number from 0 to 5; $R_{12}$, $R_{13}$ and $R_{14}$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

The application will be illustrated with specific compounds.

When A, G and X are independently selected from a cyclic sulfonate group and its derivatives or a group D, and the number of groups D is 0 or 1, it includes but is not limited to the following structural formulas:

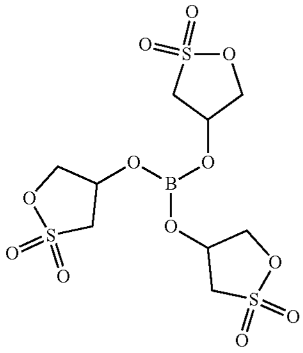

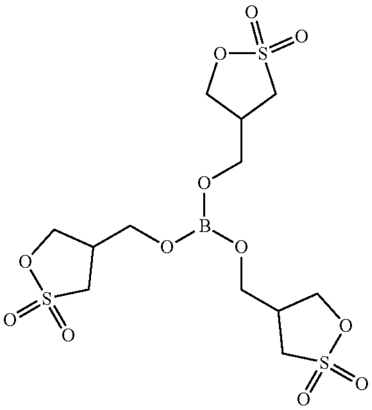

-continued

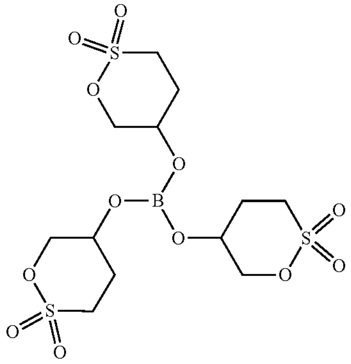

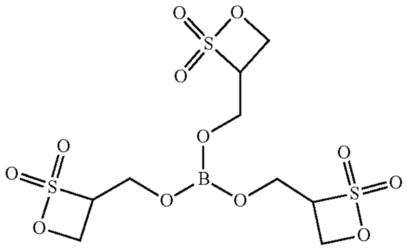

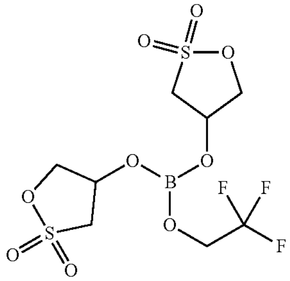

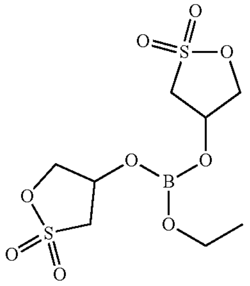

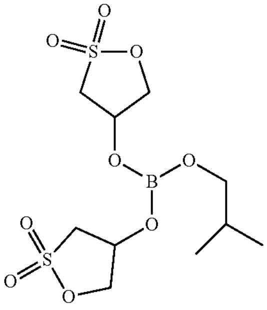

-continued
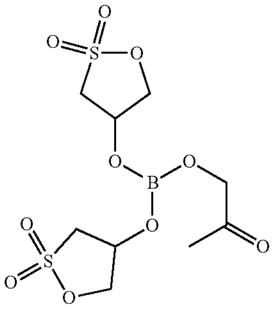
When A, G and X are independently selected from a cyclic sulfate group and its derivatives or a group D, and the number of groups D is 0 or 1, it includes but is not limited to the following structural formulas:
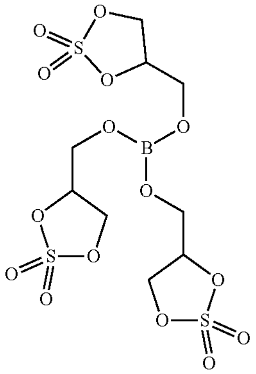
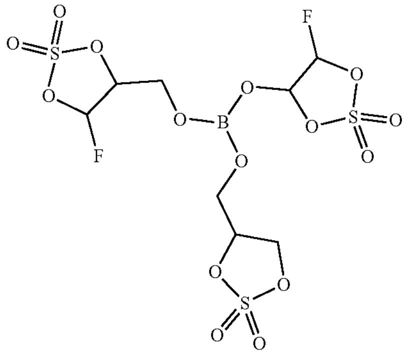
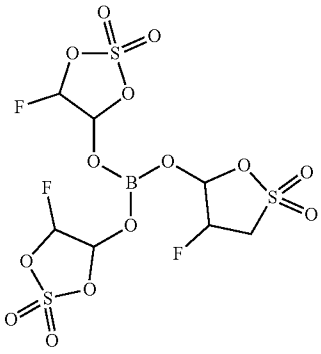
-continued
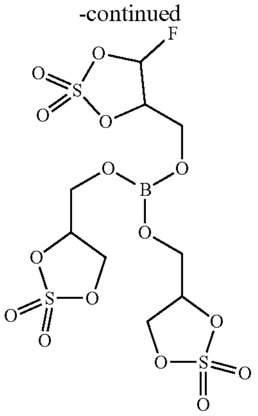
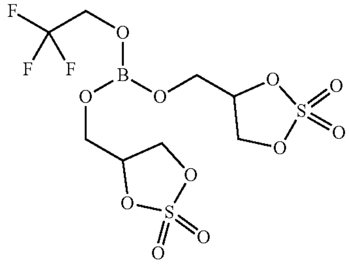
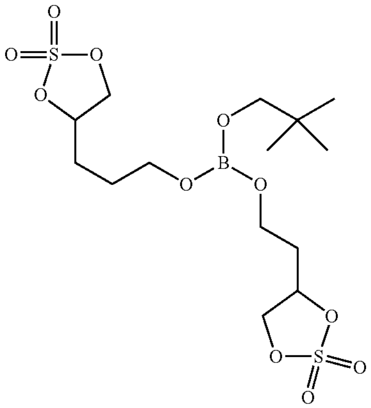
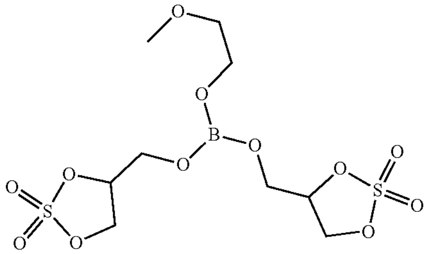
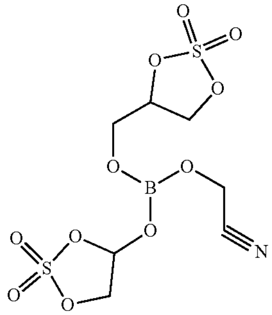

-continued
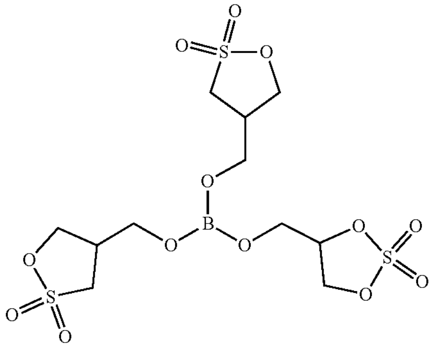
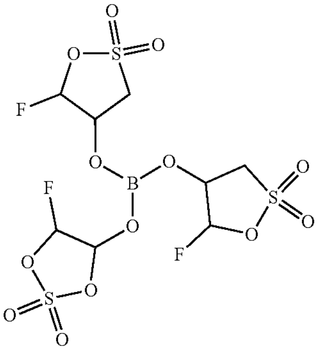
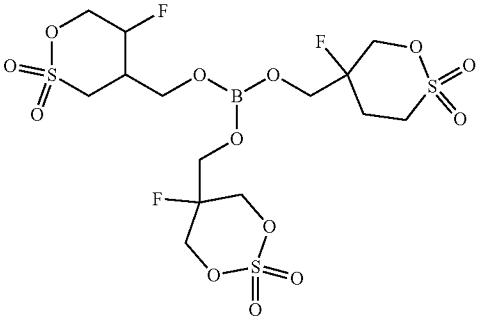
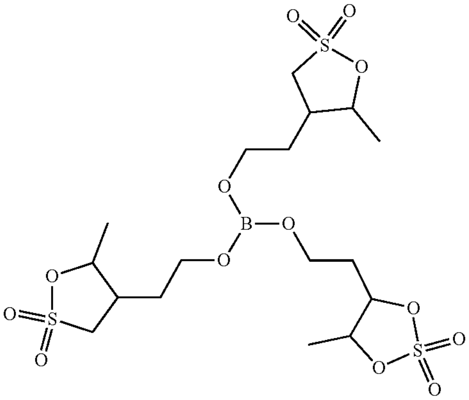
-continued
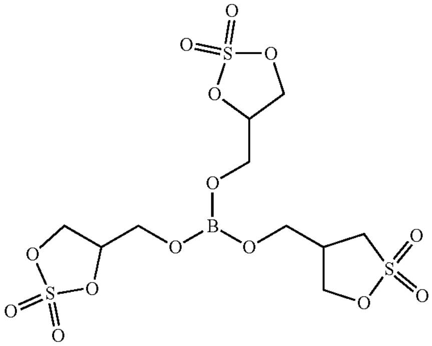
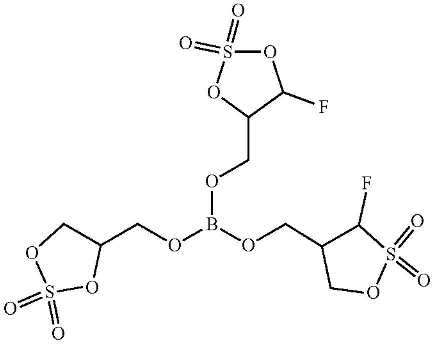
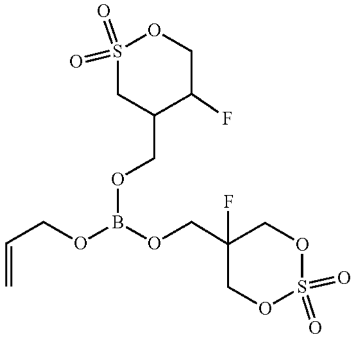
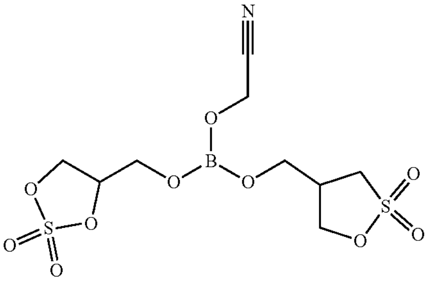
When A, G and X are independently selected from a cyclic sulfite group and its derivatives or a group D, and the number of groups D is 0 or 1, it includes but is not limited to the following structural formulas:

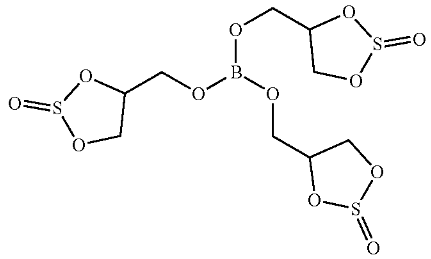
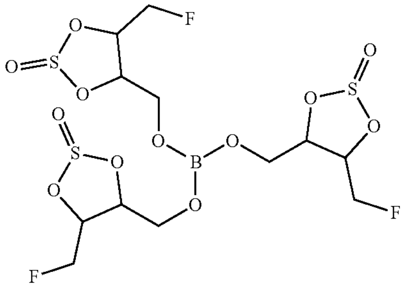
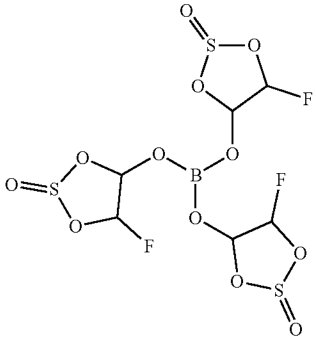
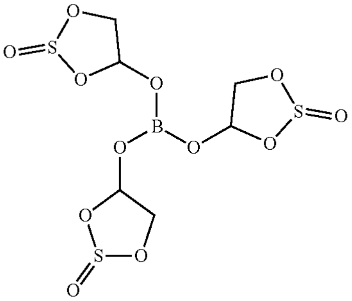
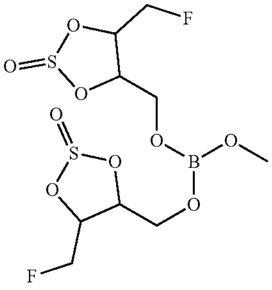
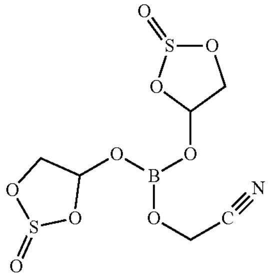
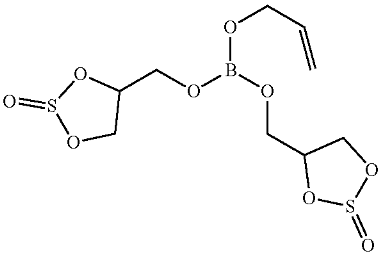
-continued
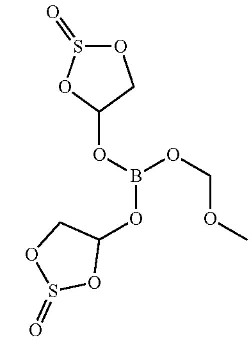
When A, G and X are independently selected from a cyclic sulfate group and its derivatives, a cyclic sulfite group and its derivatives or a group D, and the number of groups D is 0 or 1, it includes but is not limited to the following structural formulas:
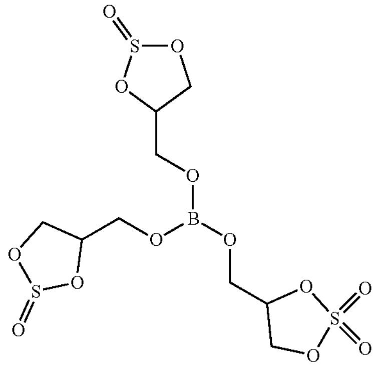
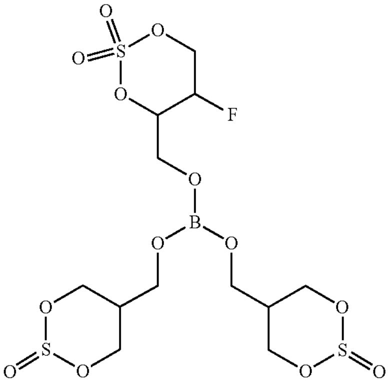
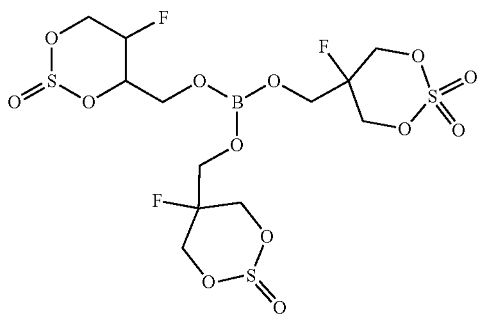

-continued
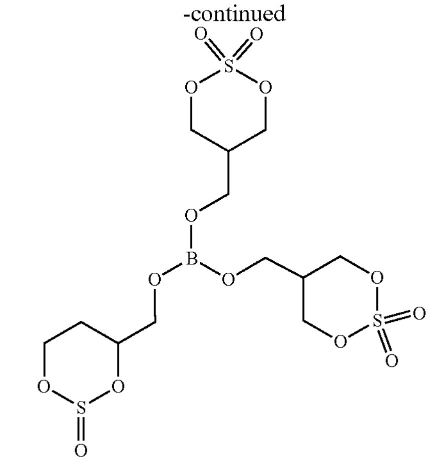
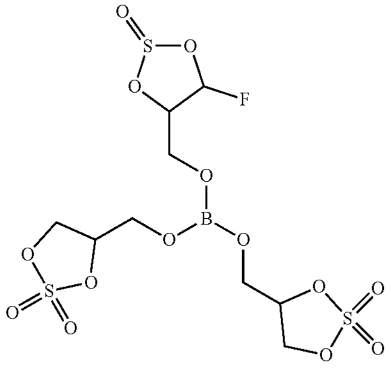
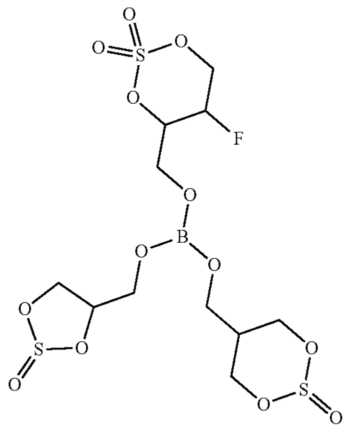
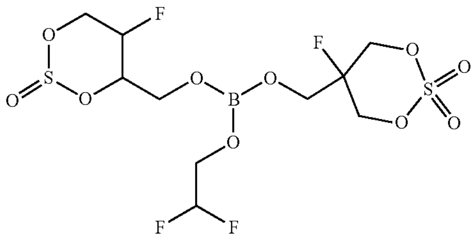
-continued
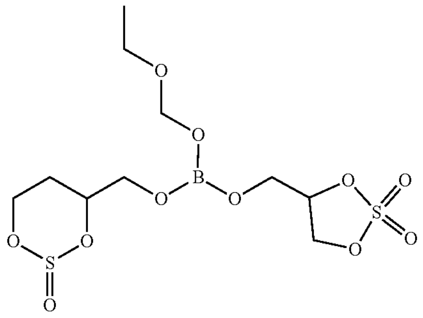
When A, G and X are independently selected from a cyclic sulfonate group and its derivatives, a cyclic sulfite group and its derivatives or a group D, and the number of groups D is 0 or 1, it includes but is not limited to the following structural formulas:
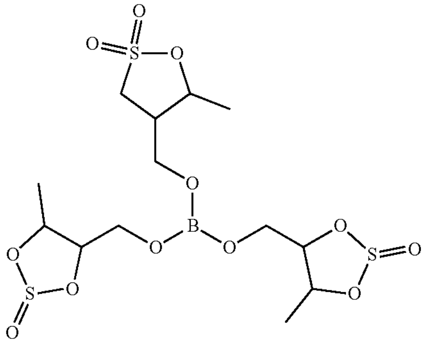
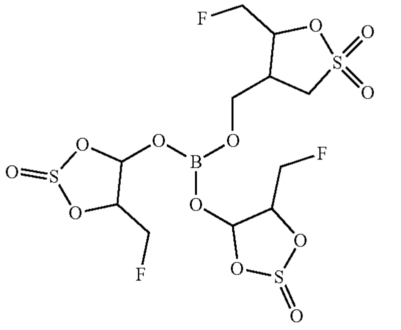
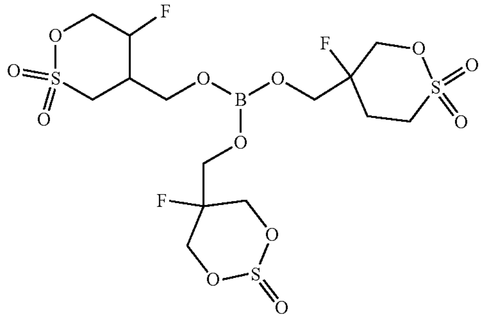

-continued

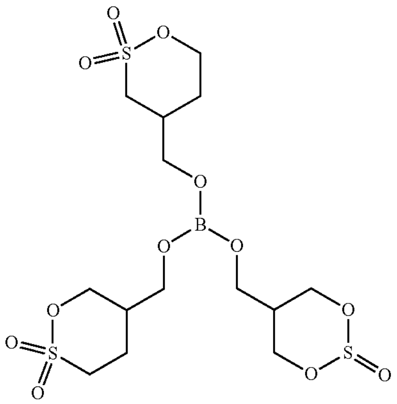

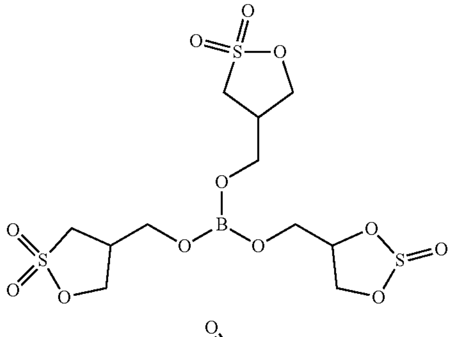

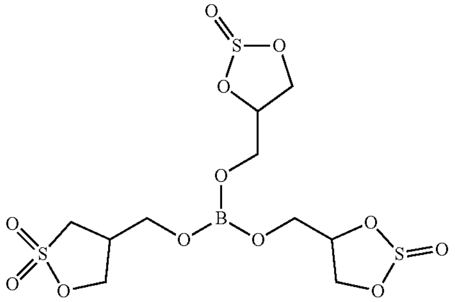

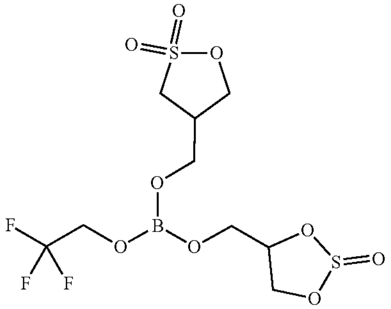

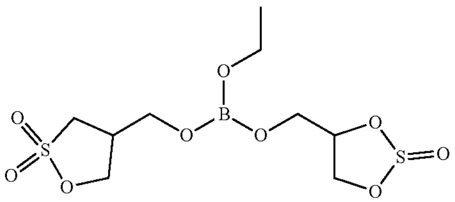

When A, G and X are respectively selected from a cyclic sulfate group and its derivatives, a cyclic sulfonate group and its derivatives, and a cyclic sulfite group and its derivatives, it includes but is not limited to the following structural formulas:

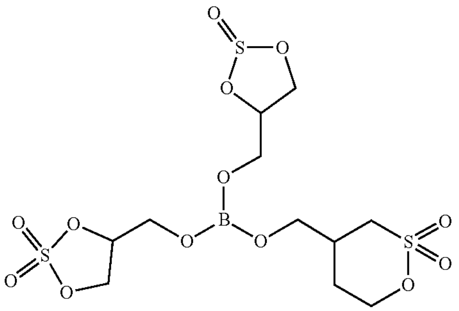

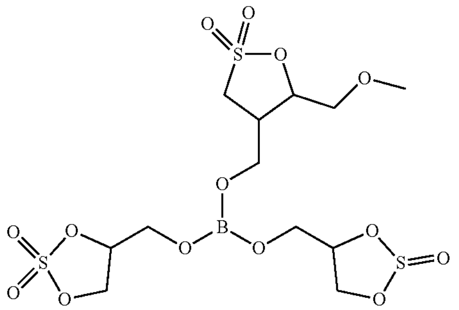

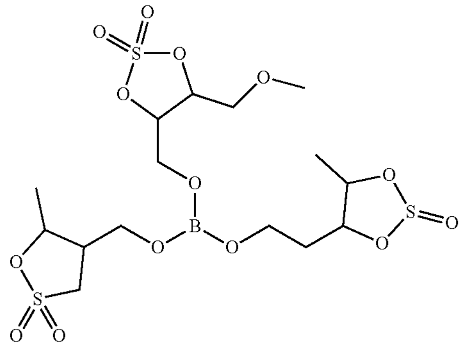

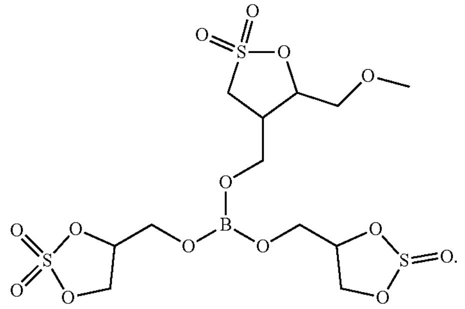

The above compounds may be used alone or in combination of two or more.

Those skilled in the art may learn the preparation method of the above compounds according to the common knowledge in the field of chemical synthesis if they learn the structural formula of the compound represented by structural formula 1. For example, boric acid ester reacts with one or more compounds represented by structural formulas I, II and III to generate the compound represented by structural formula 1.

Or: boron trichloride reacts with one or more compounds represented by structural formulas I, II and III at low temperature to generate the compound represented by structural formula 1.

Structural formula I

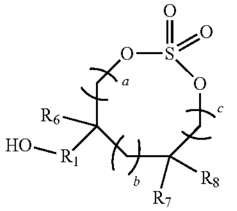

Wherein $R_1$ is selected from a single bond, a C1-C4 alkylene group and an alkylene group in which at least one hydrogen atom is substituted by a heteroatom-containing group, a, b and c are natural numbers, and a sum of a, b and c is any natural number from 0 to 5; $R_6$, $R_7$ and $R_8$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

Structural formula II

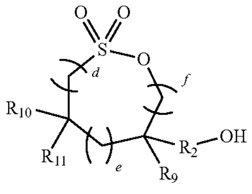

Wherein $R_2$ is selected from a single bond, a C1-C4 alkylene group, and an alkylene group in which at least one hydrogen atom is substituted by a heteroatom-containing group, e, d and f are natural numbers, and a sum of d, e and f is any natural number from 0 to 5; $R_9$, $R_{10}$ and $R_{11}$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

Structural formula III

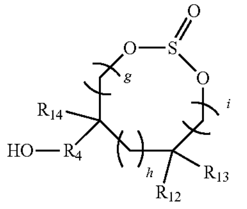

Wherein $R_4$ is selected from a single bond, a C1-C4 alkylene group and an alkylene group in which at least one hydrogen atom is substituted by a heteroatom-containing group, g, h and i are natural numbers, and a sum of g, h and i is any natural number from 0 to 5; $R_{12}$, $R_{13}$ and $R_{14}$ are each independently selected from a hydrogen atom, a halogen atom, a C1-C5 alkyl group and an alkyl group in which at least one hydrogen atom is substituted by a heteroatom-containing group, and the heteroatom includes one or more of O, N, S or halogen.

In some embodiments, an addition amount of the compound represented by structural formula 1 is 0.001-10% based on the total mass of the non-aqueous electrolyte being 100%.

In a preferred embodiment, an addition amount of the compound represented by structural formula 1 is 0.1-3% based on the total mass of the non-aqueous electrolyte being 100%.

When the addition amount of the compound represented by structural formula 1 is within the above range, the battery impedance can be effectively reduced, and the cycle capacity retention rate and high-temperature cycle performance can be improved. If the addition amount of the compound represented by structural formula 1 is too small, it is unlikely to produce obvious improvement effect on the battery performance. If the addition amount of the compound represented by structural formula 1 is too large, the function of other substances in the electrolyte may be affected because of too many decomposition products.

In some embodiments, the electrolyte salt includes one or more of lithium salt, sodium salt, potassium salt, magnesium salt, zinc salt and aluminum salt. In a preferred embodiment, the electrolyte salt is selected from lithium salt.

In a more preferred embodiment, the electrolyte salt is at least one of $LiPF_6$, LiBOB, LiDFOB, $LiPO_2F_2$, $LiBF_4$, $LiSbF_6$, $LiAsF_6$, $LiN(SO_2CF_3)_2$, $LiN(SO_2C_2F_5)_2$, $LiC(SO_2CF_3)_3$, $LiN(SO_2F)_2$ and LiBETI.

In some embodiments, the concentration of the electrolyte salt in the non-aqueous electrolyte is 0.1 mol/L-8 mol/L. In a preferred embodiment, the concentration of the electrolyte salt in the non-aqueous electrolyte is 0.5 mol/L-2.5 mol/L.

In some embodiments, the non-aqueous electrolyte further includes a functional additive, and the functional additive includes at least one of a cyclic sulfate compound, a sultone compound, a carbonate compound or an unsaturated phosphate ester compound and a nitrile compound.

In some embodiments, the cyclic sulfate compound includes ethylene sulfate;

the sultone compound is selected from at least one of 1,3-propane sultone, 1,4-butane sultone and 1,3-propene sultone;

the cyclic carbonate compound is selected from at least one of vinylene carbonate, vinylethylene carbonate, fluoroethylene carbonate or a compound represented by structural formula 5, Structural formula 5

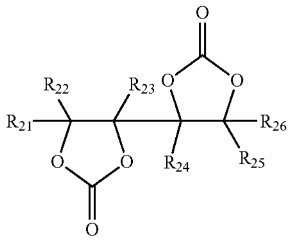

in structural formula 5, $R_{21}$, $R_{22}$, $R_{23}$, $R_{24}$, $R_{25}$ and $R_{26}$ are each independently selected from one of a hydrogen atom, a halogen atom and a C1-C5 group;

the unsaturated phosphate ester compound is selected from at least one compound represented by structural formula 6:

Structural formula 6

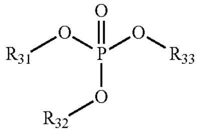

in structural formula 6, $R_{31}$, $R_{32}$ and $R_{32}$ are each independently selected from a C1-C5 saturated hydrocarbon group, a C1-C5 unsaturated hydrocarbon group, a C1-C5 halogenated hydrocarbon group and —Si$(C_mH_{2m+1})_3$, m is a natural number of 1-3, and at least one of $R_{31}$, $R_{32}$ and $R_{32}$ is an unsaturated hydrocarbon group.

In a preferred embodiment, the unsaturated phosphate compounds may be at least one selected from the group consisting of phosphoric acid tripropargyl ester, dipropargyl methyl phosphonate, dipropargyl ethyl phosphate, dipropargyl propyl phosphate, dipropargyl trifluoromethyl phosphate, dipropargyl-2,2,2-trifluoroethyl phosphate, dipropargyl-3,3,3-trifluoropropyl phosphate, dipropargyl hexafluoroisopropyl phosphate, phosphoric acid triallyl ester, diallyl methyl phosphate, diallyl ethyl phosphate, diallyl propyl phosphate, diallyl trifluoromethyl phosphate, diallyl-2,2,2-trifluoroethyl phosphate, diallyl-3,3,3-trifluoropropyl phosphate or diallyl hexafluoroisopropyl phosphate.

The nitrile compound includes one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

In a preferred embodiment, the addition amount of the functional additive is 0.001-10% based on the total mass of the non-aqueous electrolyte being 100%.

In the non-aqueous electrolyte, compared with the way of adding the one additive alone or adding the combination of other existing additives, the way of adding the compound represented by structural formula 1 together with the existing functional additive shows an obvious synergistic effect in improving the high-temperature cycle performance of battery. It indicates that the compound represented by structural formula 1 and the existing functional additive can form a film on the electrode surface together, which can make up for the film-forming defect of adding only one additive, thus obtaining a more stable passive film.

In some embodiments, the solvent includes one or more of ether solvent, nitrile solvent, carbonate solvent and carboxylate solvent.

In some embodiments, the ether solvent includes a cyclic ether or chain ether, and the cyclic ether may be but not limited to one or more of 1,3-dioxolane (DOL), 1,4-dioxane (DX), crown ether, tetrahydrofuran (THF), 2-methyltetrahydrofuran (2-CH3-THF), 2-trifluoromethyltetrahydrofuran (2-CF3); the chain ether may be one or more of dimethoxymethane (DMM), 1,2-dimethoxyethane (DME) and diglyme (TEGDME). The nitrile solvent may be but not limited to one or more of acetonitrile, glutaronitrile and malononitrile. The carbonate solvent includes a cyclic carbonate or chain carbonate, and the cyclic carbonate may be but not limited to one or more of ethylene carbonate (EC), propylene carbonate (PC), γ-butyrolactone GBL) and butylene carbonate (BC); the chain carbonate may be but not limited to one or more of dimethyl carbonate (DMC), ethyl methyl carbonate (EMC), diethyl carbonate (DEC) and dipropyl carbonate (DPC). The carboxylate solvent may be but not limited to one or more of methyl acetate (MA), ethyl acetate (EA), n-propyl acetate (EP), butyl acetate, propyl propionate (PP) and butyl propionate.

Another embodiment of the present application provides a battery, including a positive electrode, a negative electrode, and the above-described non-aqueous electrolyte.

With the non-aqueous electrolyte, the battery can form a passivation film with excellent performance on the positive electrode and the negative electrode, thereby effectively improving the high-temperature storage performance and high-temperature cycle performance of battery and improving the power characteristics of battery.

In some embodiments, the battery is a secondary battery, which may be a lithium secondary battery, a potassium secondary battery, a sodium secondary battery, a magnesium secondary battery, a zinc secondary battery, an aluminum secondary battery, and the like.

In a preferred embodiment, the battery is a lithium metal battery, a lithium ion battery or a lithium sulfur battery.

In some embodiments, the positive electrode includes a positive electrode active material, and the type of the positive electrode active material is not particularly limited, as long as it is a positive electrode active material capable of reversibly intercalating/deintercalating metal ions (lithium ion, sodium ion, potassium ion, magnesium ion, zinc ion, aluminum ion, etc.) or a conversion positive electrode material. Preferably, the positive electrode active material is selected from at least one of Ni—Co—Mn ternary material, $LiFePO_4$, $LiCoO_2$, sulfur and its composites.

In some embodiments, the negative electrode includes a negative electrode active material, including one or more of a carbon-based negative electrode, a tin-based negative electrode, a lithium negative electrode, a sodium negative electrode, a potassium negative electrode, a magnesium negative electrode, a zinc negative electrode and an aluminum negative electrode. The carbon-based negative electrode may include graphite, hard carbon, soft carbon, graphene, mesocarbon microbead, etc. The tin-based negative electrode may include tin, tin carbon, tin oxide and tin metal compound. The lithium negative electrode may include metallic lithium or lithium alloy. The lithium alloy may be at least one of lithium silicon alloy, lithium sodium alloy, lithium potassium alloy, lithium aluminum alloy, lithium tin alloy and lithium indium alloy.

In some embodiments, the battery further includes a separator, and the separator is positioned between the positive electrode and the negative electrode.

The separator may be an existing conventional diaphragm, a polymer diaphragm, a non-woven fabric and the like, including but not limited to single-layer PP (polypropylene), single-layer PE (polyethylene), double-layer PP/PE, double-layer PP/PP and triple-layer PP/PE/PP and the like.

The present application will be further illustrated with examples.

TABLE 1

| | |
|---|---|
| Compound 1 | 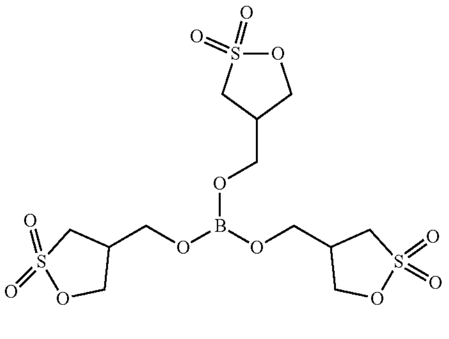 [SMILES: O=S1(=O)CC(COB(OCC2COS(=O)(=O)C2)OCC2COS(=O)(=O)C2)CO1] |
| Compound 2 | 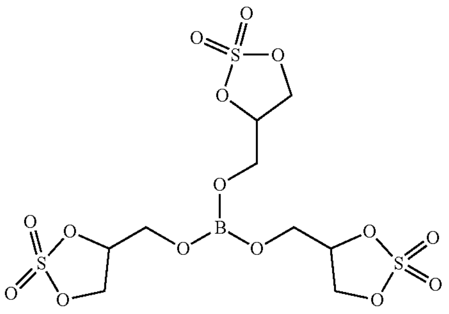 [SMILES: O=S1(=O)OCC(COB(OCC2COS(=O)(=O)O2)OCC2COS(=O)(=O)O2)O1] |
| Compound 3 | 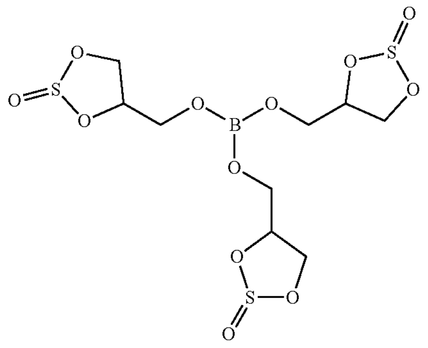 [SMILES: O=S1OCC(COB(OCC2COS(=O)O2)OCC2COS(=O)O2)O1] |
| Compound 4 | 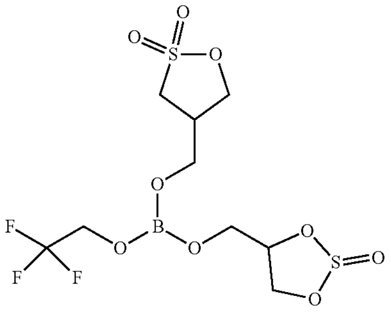 [SMILES: O=S1OCC(COB(OCC2COS(=O)(=O)C2)OCC(F)(F)F)O1] |

TABLE 1-continued

| | |
|---|---|
| Compound 5 | 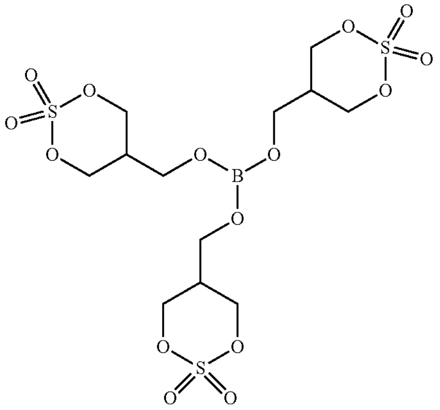 [SMILES: O=S1(=O)OCC(COB(OCC2COS(=O)(=O)OC2)OCC2COS(=O)(=O)OC2)CO1] |
| Compound 6 | 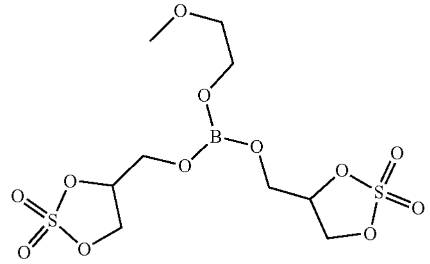 [SMILES: COCCOB(OCC1COS(=O)(=O)O1)OCC1COS(=O)(=O)O1] |

Note:
Compounds 1 to 6 used in the following embodiments and comparative examples are selected from Table 1.

Embodiments 1 to 13

The embodiment is used to explain the preparation method of the non-aqueous electrolyte and the battery disclosed by the application, including the following steps.

1) Preparation of Non-Aqueous Electrolyte.

Ethylene carbonate (EC), diethyl carbonate (DEC) and ethyl methyl carbonate (EMC) were mixed according to the mass ratio of EC:DEC:EMC=1:1:1, and then lithium hexafluorophosphate ($LiPF_6$) was added until the molar concentration was 1 mol/L. Based on the total mass of the non-aqueous electrolyte being 100%, the mass percentages of Embodiments 1-13 shown in Table 2 were added.

2) Preparation of Positive Plate

According to the mass ratio of 93:4:3, positive electrode active material Li—Ni—Mn—Co oxide $LiNi_{0.5}Co_{0.2}Mn_{0.3}O$, conductive carbon black Super-P and binder polyvinylidene fluoride (PVDF) were mixed, and then the mixture was dispersed in N-methyl-2-pyrrolidone (NMP) to obtain a positive electrode slurry. The slurry was evenly coated on both sides of an aluminum foil, dried, calendered and vacuum-dried, and an aluminum lead wire was welded by an ultrasonic welding machine to obtain a positive electrode plate with a thickness of 120-150 μm.

3) Preparation of Negative Plate

According to the mass ratio of 94:1:2.5:2.5, negative electrode active material of artificial graphite, conductive carbon black Super-P, binder styrene-butadiene rubber (SBR) and carboxymethyl cellulose (CMC) were mixed, and then the mixture was dispersed in deionized water to obtain a negative electrode slurry. The slurry was coated on both sides of the copper foil, dried, calendered and vacuum-dried, and a nickel lead wire was welded by an ultrasonic welding machine to obtain a negative electrode plate with a thickness of 120-150 μm.

4) Preparation of Battery Core

A three-layer diaphragm with a thickness of 20 μm was placed between the positive plate and the negative plate as a separator. And then the sandwich structure composed of the positive plate, the negative plate and the separator was wound. Then the winding body was flattened and put into an aluminum foil packaging bag and baked in vacuum at 75° C. for 48 hours to obtain a battery core to be injected with liquid.

5) Injection and Formation of Battery Core

In a glove box with the dew point controlled below −40° C., the prepared electrolyte was injected into the battery core, vacuum-packaged and left to set for 24 hours.

Then the routine formation of first charge was performed according to the following steps: charged at 0.05 C constant current for 180 min, charged at 0.2 C constant current to 3.95V, and sealed with secondary vacuum, then further charged at 0.2 C constant current to 4.2V, left to set at room temperature for 24 hr, and discharged at 0.2 C constant current to 3.0V to obtain a $LiNi_{0.5}Co_{0.2}Mn_{0.3}O_2$/artificial graphite lithium ion battery.

Comparative Examples 1-5

The embodiments and examples are used for comparison and explanation of preparation method of the non-aqueous electrolyte and battery disclosed in this application, including most of the steps of Embodiment 1, except that:

for the preparation of non-aqueous electrolyte, the additive is added according to the mass percentage of Comparative examples 1-5 shown in Table 2.

Performance Tests

The lithium ion batteries prepared in Embodiments 1-13 and Comparative Examples 1-5 were tested for the following performance.

High-Temperature Cycle Performance Test

The prepared lithium ion battery was placed in an oven with a constant temperature of 45° C., charged to 4.2V at 1 C constant current, then charged at a constant current and constant voltage until the current dropped to 0.05 C, and then discharged to 3.0V at 1 C constant current, this step was repeated, and the first discharge capacity and the last discharge capacity were recorded.

The capacity retention rate of high-temperature cycle is calculated according to the following formula:

Capacity retention rate=last discharge capacity/first discharge capacity×100%.

The test results are shown in Table 2.

TABLE 2

| Embodiment/ Comparative example | Compound represented by structural formula 1 and its content | Other additives and contents | Cycle at 45° C. /1 C Capacity retention rate 500 cycles | 1000 cycles |
|---|---|---|---|---|
| Embodiment 1 | Compound 1: 1.0% | — | 89.2% | 87.3% |
| Embodiment 2 | Compound 2: 1.0% | — | 87.6% | 85.5% |
| Embodiment 3 | Compound 3: 1.0% | — | 88.3% | 86.7% |
| Embodiment 4 | Compound 4: 1.0% | — | 87.2% | 85.3% |
| Embodiment 5 | Compound 5: 1.0% | — | 87.4% | 85.2% |
| Embodiment 6 | Compound 6: 1.0% | — | 89.3% | 86.3% |
| Embodiment 7 | Compound 1: 0.1% | — | 80.5% | 78.6% |
| Embodiment 8 | Compound 1: 0.5% | — | 86.8% | 84.9% |
| Embodiment 9 | Compound 1: 2% | — | 89.6% | 85.4% |
| Embodiment 10 | Compound 1: 5% | — | 85.2% | 81.5% |
| Embodiment 11 | Compound 1: 8% | — | 83.8% | 80.3% |
| Embodiment 12 | Compound 1: 1.0% | DTD: 1.0% | 93.5% | 89.1% |
| Embodiment 13 | Compound 1: 1.0% | VC: 1.0% | 91.3% | 88.9% |
| Comparative example 1 | — | — | 67.5% | 56.3% |
| Comparative example 2 | — | VC: 1.0% | 86.4% | 83.3% |
| Comparative example 3 | — | DTD: 1.0% | 87.1% | 85.1% |
| Comparative example 4 | — | PS: 1.0% | 82.6% | 80.6% |
| Comparative example 5 | | VC: 1.0% DTD: 1.0% | 89.2% | 86.1% |

From the test results of Embodiments 1-6 and Comparative examples 1-4, it can be seen that compared with the traditional vinylene carbonate (VC), ethylene sulfate (DTD) and 1,3-propane sultone (PS), when the compound represented by structural formula 1 provided by this application is adopted as an additive, the high-temperature cycle performance of lithium ion battery is obviously improved. It indicates that the passivation film formed by the compound represented by structural formula 1 has more excellent high-temperature stability.

From the test results of Embodiment 1 and Embodiments 7-11, it can be seen that the high-temperature cycle performance of lithium ion battery first increases and then decreases with the increase of the addition amount of the compound represented by structural formula 1, especially when the addition amount of the compound represented by structural formula 1 is 0.5-2%, the lithium ion battery has the best high-temperature cycle performance.

From the test results of Embodiment 12 and Comparative Example 5, it can be seen that compared with the traditional combination additives of vinylene carbonate (VC) and ethylene sulfate (DTD), when the compound represented by structural formula 1 provided by this application is combined with ethylene sulfate (DTD), the performance is further improved. It indicates the passivation film formed by the compound represented by structural formula 1 has more excellent high-temperature stability.

From the test results of Embodiment 13 and Embodiment 1, it can be seen that compared with the way of adding the compound represented by structural formula 1 alone, the combination of the compound represented by structural formula 1 and vinylene carbonate (VC) can improve the high-temperature cycle performance of battery more obviously. It indicates that the passivation film formed by the compound represented by both the structural formula 1 and vinylene carbonate (VC) has good high-temperature stability.

The above are merely the preferred embodiments of this application, and are not intended to limit the application. Any modification, equivalent substitution and improvement made within the spirit and principle of this application shall be included in the protection scope of this application.

The invention claimed is:

1. A non-aqueous electrolyte, comprising a solvent, an electrolyte salt and a compound represented by structural formula 1:

Structural formula 1

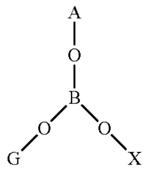

wherein, A, G and X are each independently selected from a cyclic sulfate group and its derivatives, a cyclic sulfonate group and its derivatives, a cyclic sulfite group and its derivatives or a group D; one or none of A, G and X is selected from the group D, and the group D is selected from a C1-C4 alkyl group, a C1-C4 unsaturated hydrocarbon group, a C1-C4 haloalkyl group, a C1-C4 nitrile group, a C1-C4 ether group or a C1-C4 ketone group.

2. The non-aqueous electrolyte of claim 1, wherein the cyclic sulfate group and its derivatives are selected from a group represented by structural formula 2:

Structural formula 2

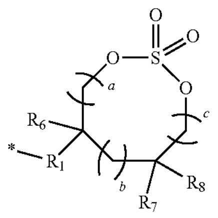

wherein * is a bonding position, $R_1$ is selected from a single bond, a C1-C4 alkylene group and an alkylene group in which at least one hydrogen atom is substituted by a heteroatom-containing group, a, b and c are natural numbers, and a sum of a, b and c is any natural number from 0 to 5; $R_6$, $R_7$ and $R_8$ are each independently selected from a hydrogen atom, a halogen atom, a C1-C5 alkyl group and an alkyl group in which at least one hydrogen atom is substituted by a heteroatom-containing group, and the heteroatom comprises one or more of O, N, S or halogen.

3. The non-aqueous electrolyte of claim 1, wherein the cyclic sulfonate group and its derivatives are selected from a group represented by structural formula 3:

Structural formula 3

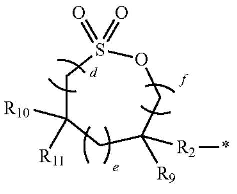

wherein * is a bonding position, $R_2$ is selected from a single bond, a C1-C4 alkylene group, and an alkylene group in which at least one hydrogen atom is substituted by a heteroatom-containing group, e, d and f are natural numbers, and a sum of d, e and f is any natural number from 0 to 5; $R_9$, $R_{10}$ and $R_{11}$ are each independently selected from a hydrogen atom, a halogen atom, a C1-C5 alkyl group and an alkyl group in which at least one hydrogen atom is substituted by a heteroatom-containing group, and the heteroatom comprises one or more of O, N, S or halogen.

4. The non-aqueous electrolyte of claim 1, wherein the cyclic sulfite group and its derivatives are selected from a group represented by structural formula 4:

Structural formula 4

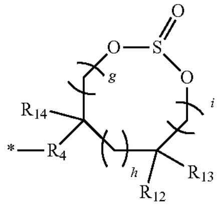

wherein * is a bonding position, $R_4$ is selected from a single bond, a C1-C4 alkylene group and an alkylene group in which at least one hydrogen atom is substituted by a heteroatom-containing group, g, h and i are natural numbers, and a sum of g, h and i is any natural number from 0 to 5; $R_{12}$, $R_{13}$ and $R_{14}$ are each independently selected from a hydrogen atom, a halogen atom, a C1-C5 alkyl group and an alkyl group in which at least one hydrogen atom is substituted by a heteroatom-containing group, and the heteroatom comprises one or more of O, N, S or halogen.

5. The non-aqueous electrolyte of claim 1, wherein the compound represented by structural formula 1 is selected from one or more of the following compounds:

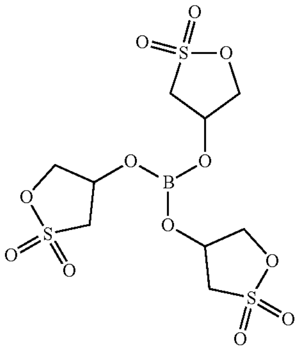
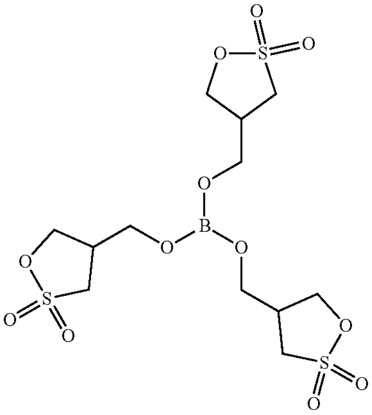
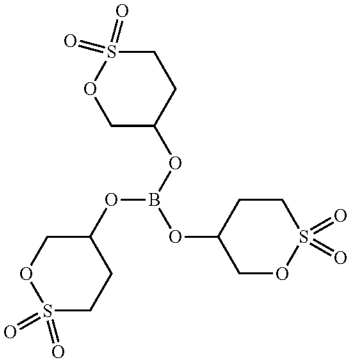
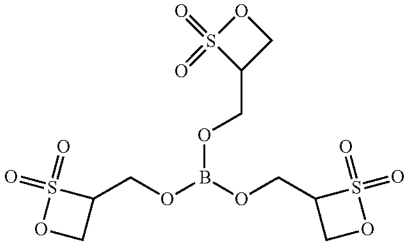
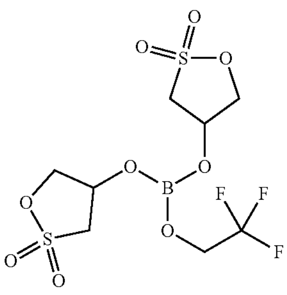
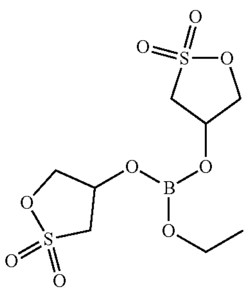
-continued
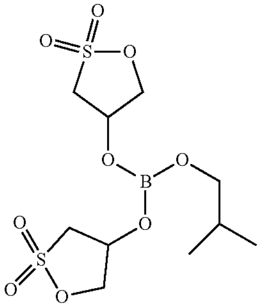
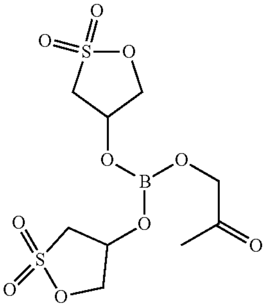
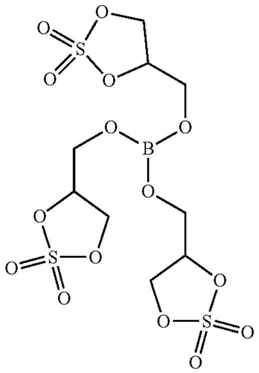
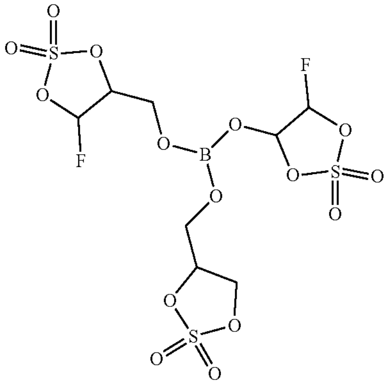
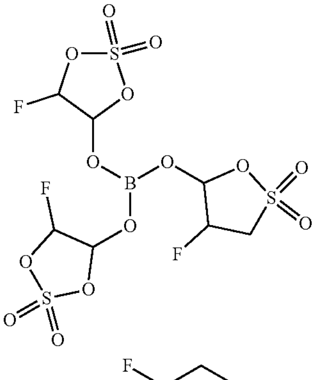
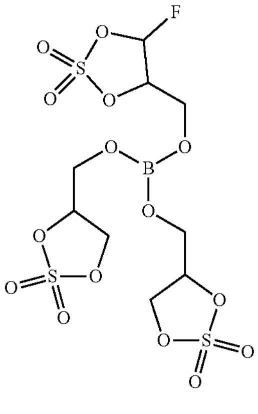
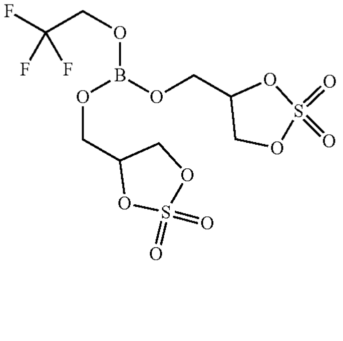

-continued
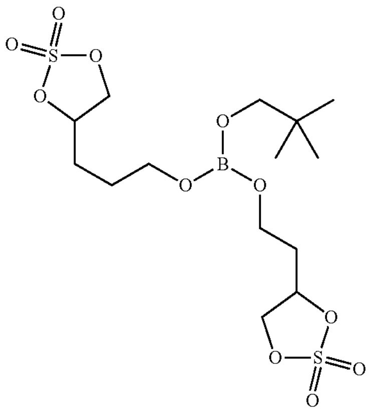
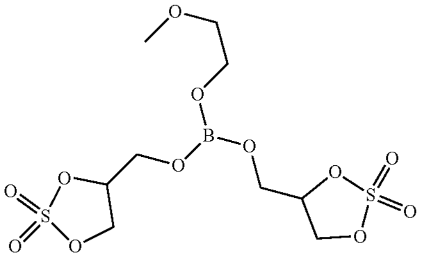
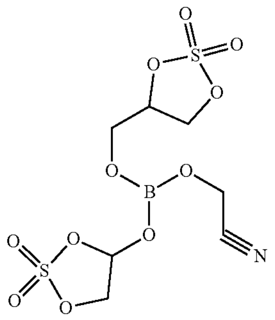
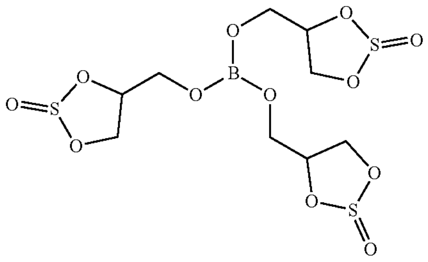
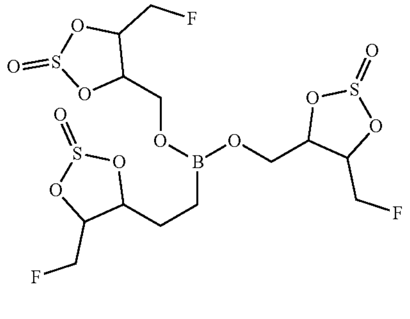
-continued
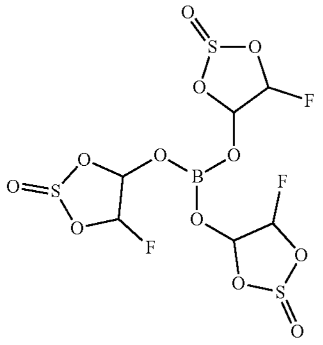
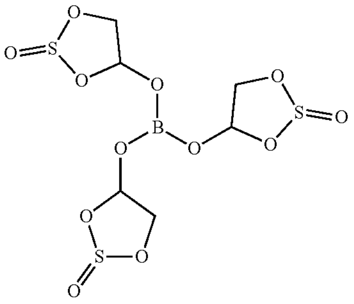
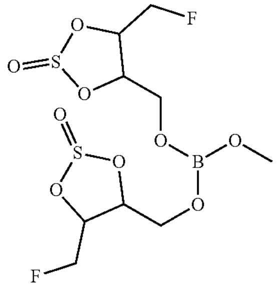
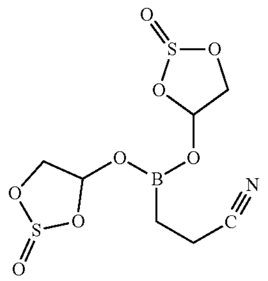
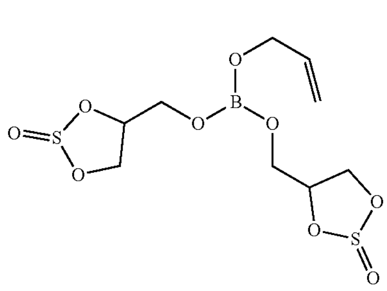
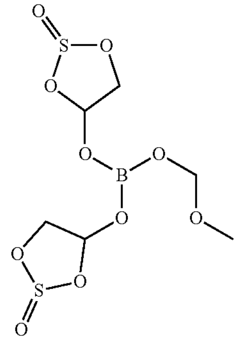

-continued
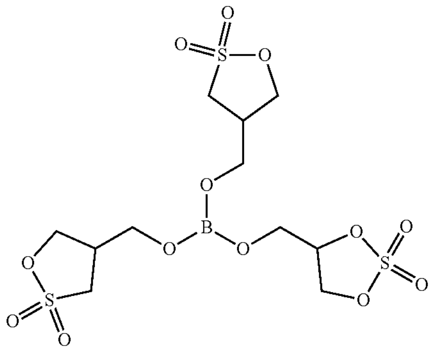
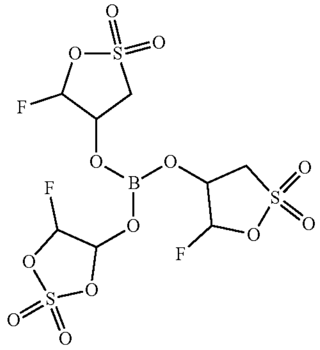
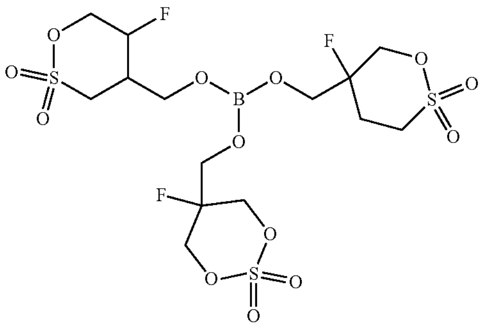
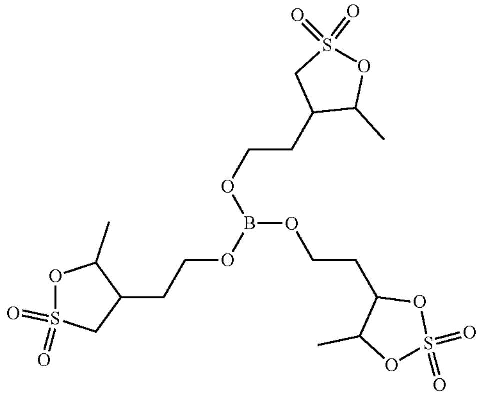
-continued
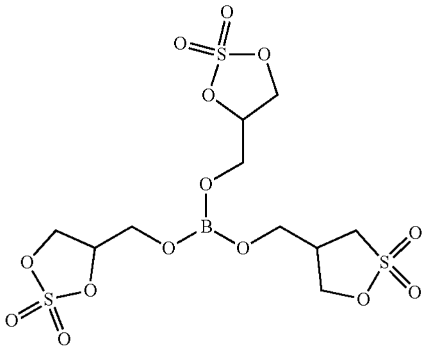
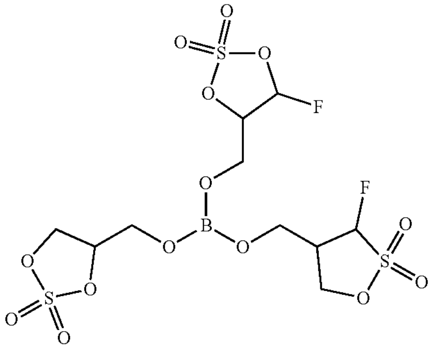
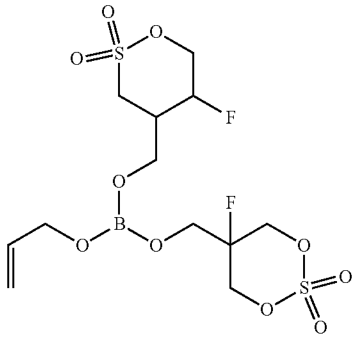
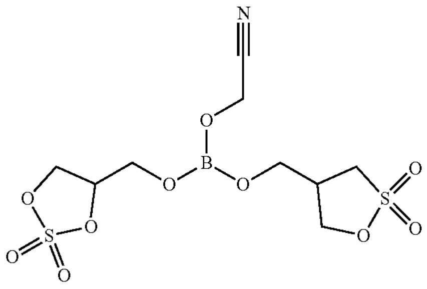
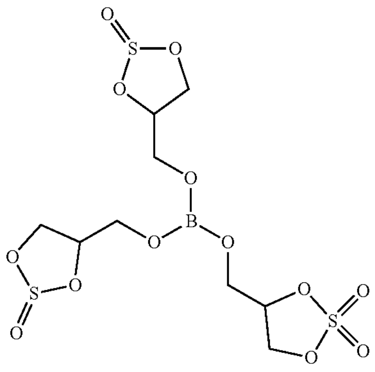

-continued
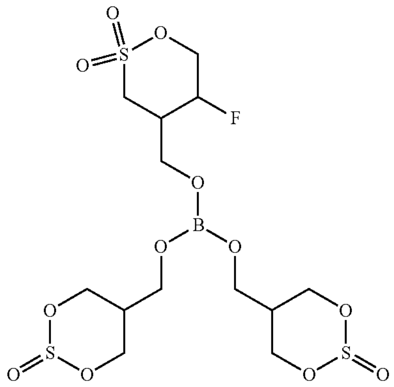
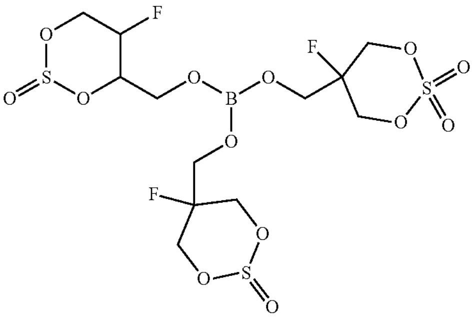
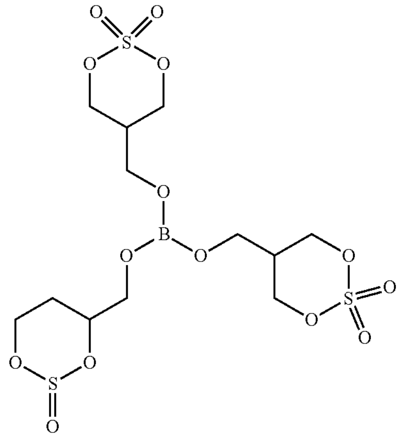
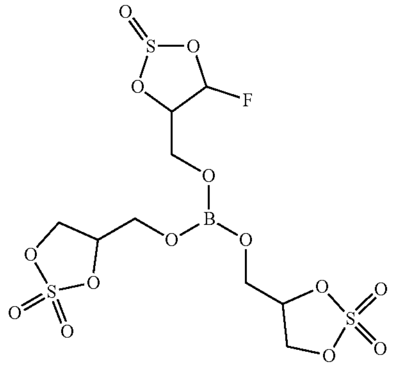
-continued
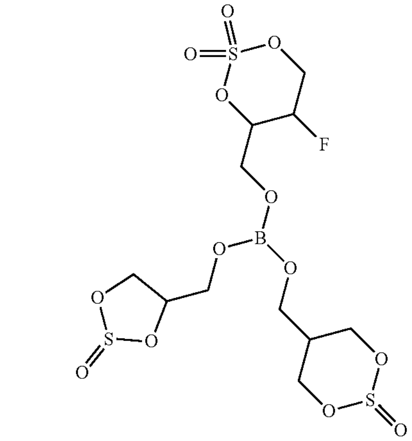
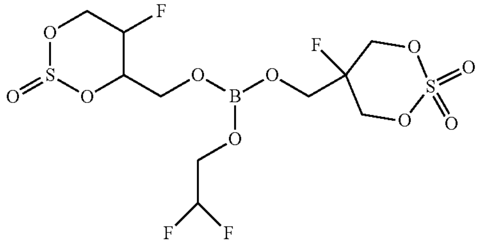
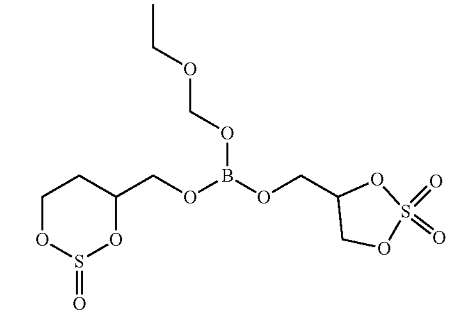
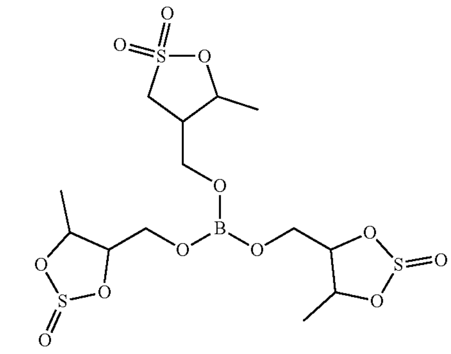
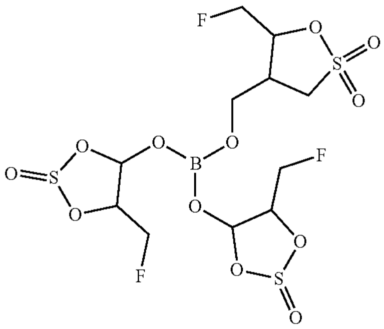

-continued

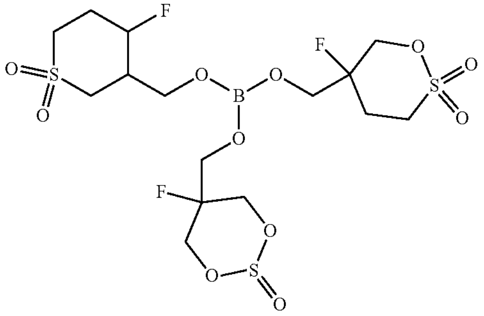

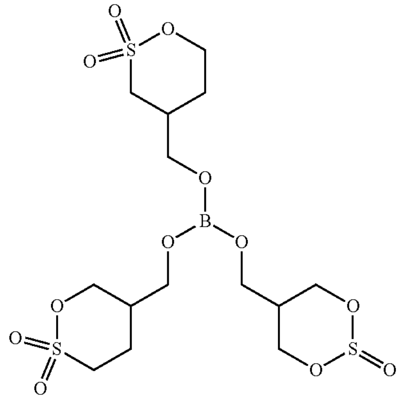

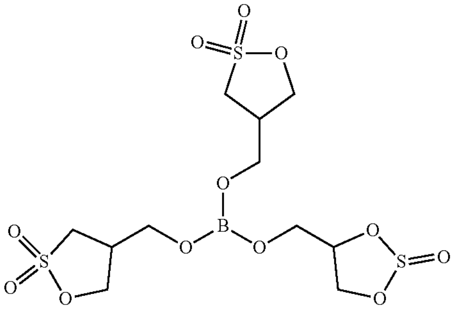

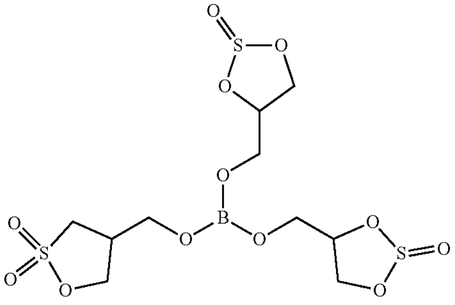

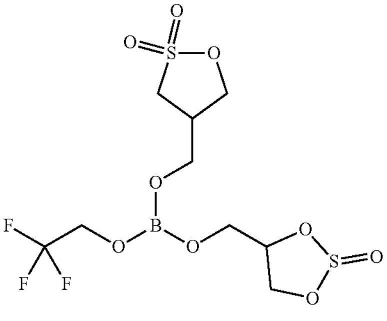

-continued

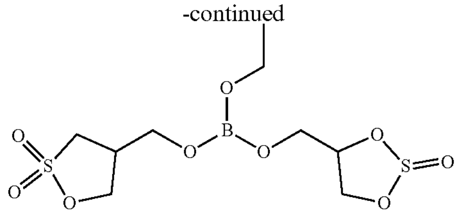

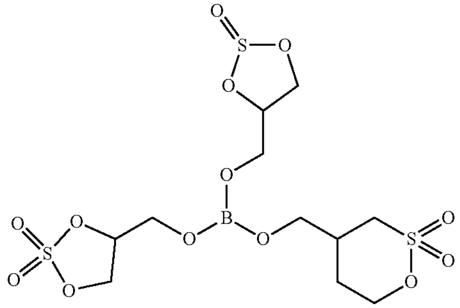

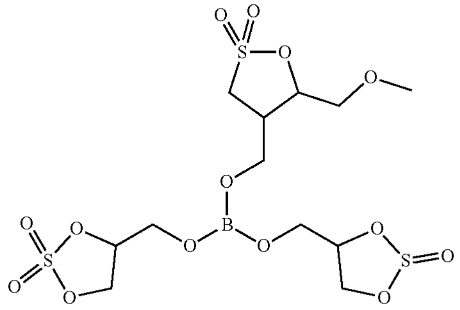

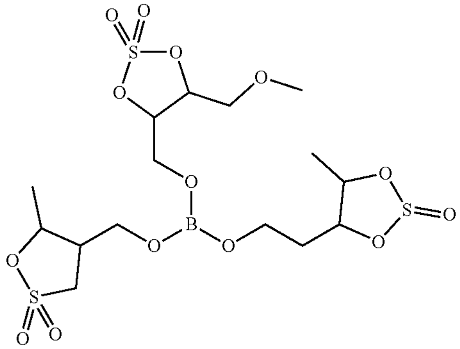

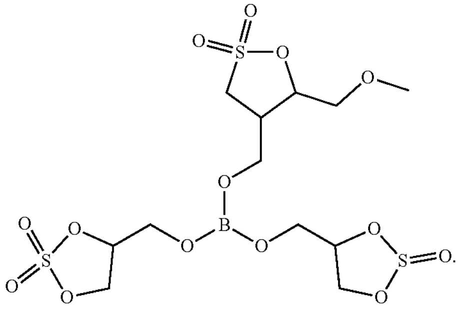

6. The non-aqueous electrolyte of claim 1, wherein an addition amount of the compound represented by structural formula 1 is 0.001-10% based on the total mass of the non-aqueous electrolyte being 100%.

7. The non-aqueous electrolyte of claim 1, wherein an addition amount of the compound represented by structural formula 1 is 0.1-3% based on the total mass of the non-aqueous electrolyte being 100%.

8. The non-aqueous electrolyte of claim 1, wherein the electrolyte salt is selected from at least one of $LiPF_6$, $LiBOB$, LiDFOB, $LiPO_2F_2$, $LiBF_4$, $LiSbF_6$, $LiAsF_6$, LIN $(SO_2CF_3)_2$, LiN $(SO_2C_2F_5)_2$, LiC $(SO_2CF_3)_3$, LiN $(SO_2F)_2$ and LiBETI.

9. The non-aqueous electrolyte of claim 1, wherein the non-aqueous electrolyte further comprises a functional additive, and the functional additive comprises at least one of a cyclic sulfate compound, a sultone compound, a cyclic carbonate compound or an unsaturated phosphate ester compound and a nitrile compound.

10. The non-aqueous electrolyte of claim 9, wherein the cyclic sulfate compound comprises ethylene sulfate;

the sultone compound is selected from at least one of 1,3-propane sultone, 1,4-butane sultone and 1,3-propene sultone;

the cyclic carbonate compound is selected from at least one of vinylene carbonate, vinylethylene carbonate, fluoroethylene carbonate or a compound represented by structural formula 5, Structural formula 5

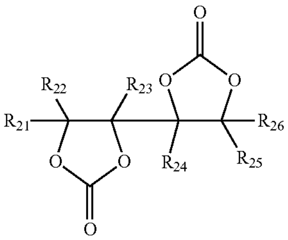

in structural formula 5, $R_{21}$, $R_{22}$, $R_{23}$, $R_{24}$, $R_{25}$ and $R_{26}$ are each independently selected from one of a hydrogen atom, a halogen atom and a C1-C5 group;

the unsaturated phosphate ester compound is selected from at least one compound represented by structural formula 6:

Structural formula 6

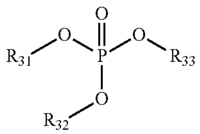

in structural formula 6, $R_{31}$, $R_{32}$ and $R_{32}$ are each independently selected from a C1-C5 saturated hydrocarbon group, a C1-C5 unsaturated hydrocarbon group, a C1-C5 halogenated hydrocarbon group and —Si $(C_mH_{2m+1})_3$, m is a natural number of 1-3, and at least one of $R_{31}$, $R_{32}$ and $R_{32}$ is an unsaturated hydrocarbon group; and the nitrile compound comprises one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

11. The non-aqueous electrolyte of claim 1, wherein the solvent comprises one or more of ethylene carbonate, propene carbonate, butylene carbonate, dimethyl carbonate, diethyl carbonate, ethyl methyl carbonate and methyl propyl carbonate.

12. A battery, comprising a positive electrode, a negative electrode and the non-aqueous electrolyte of claim 1.

* * * * *